United States Patent
Dick et al.

(10) Patent No.: US 9,032,038 B2
(45) Date of Patent: May 12, 2015

(54) RECIPIENT CONTROL SYSTEM FOR ENSURING NON-CONFLICTING AND COMPREHENSIVE DISTRIBUTION OF DIGITAL INFORMATION AND METHOD THEREOF

(71) Applicant: Gatekeeper Solutions, Inc., Dix Hills, NY (US)

(72) Inventors: Stephen G. Dick, Nesconset, NY (US); Todd Cohen, Dix Hills, NY (US); Barry Miller, Dix Hills, NY (US); Lawrence Garnier, Shirley, NY (US)

(73) Assignee: Gatekeeper Solutions, Inc., Dix Hills, NY (US)

( * ) Notice: Subject to any disclaimer, the term of this patent is extended or adjusted under 35 U.S.C. 154(b) by 35 days.

(21) Appl. No.: 14/027,126

(22) Filed: Sep. 13, 2013

(65) Prior Publication Data

US 2015/0081803 A1 Mar. 19, 2015

(51) Int. Cl.
*G06F 15/16* (2006.01)
*H04L 12/58* (2006.01)
*G06Q 10/10* (2012.01)

(52) U.S. Cl.
CPC ............... *H04L 51/18* (2013.01); *H04L 51/12* (2013.01); *G06Q 10/107* (2013.01); *H04L 51/14* (2013.01)

(58) Field of Classification Search
CPC ......... H04L 51/12; H04L 51/14; H04L 51/28; H04L 12/58; G06Q 10/107
USPC ....................................................... 709/206
See application file for complete search history.

(56) References Cited

U.S. PATENT DOCUMENTS

| | | | |
|---|---|---|---|
| 6,816,884 B1 * | 11/2004 | Summers | 709/206 |
| 7,548,952 B2 | 6/2009 | Delia et al. | |
| 7,552,185 B1 | 6/2009 | Kirzner et al. | |
| 7,590,693 B1 | 9/2009 | Chan et al. | |
| 7,664,821 B1 | 2/2010 | Ancin et al. | |
| 7,818,385 B2 | 10/2010 | Naick et al. | |
| 7,886,011 B2 | 2/2011 | Buchheit | |
| 2003/0220835 A1 * | 11/2003 | Barnes, Jr. | 705/14 |

(Continued)

OTHER PUBLICATIONS

Blackbaud NetCommunity Email Guide; Nov. 9, 2012.

(Continued)

*Primary Examiner* — Larry Donaghue
(74) *Attorney, Agent, or Firm* — Gloria Tsui-Yip, Esq.; Miskin & Tsui-Yip, LLP

(57) ABSTRACT

A system and method for ensuring an electronic communication sent by a user to one or more recipients is not sent to one or more inappropriate recipients. The system and method controls, monitors, detects and prevents sending of electronic communications to an unintended recipient or recipients. The system and method also controls, monitors, detects and ensures electronic communications are sent to all intended recipients. Based on parameters that identify conditions for an inappropriate recipient, the system and method compares each recipient of an electronic communication with the parameters and stops the sending if an inappropriate recipient exists. A notification is then provided identifying each inappropriate recipient and the parameters that were triggered. Mechanism to override the stopping of the electronic communication may be provided.

45 Claims, 18 Drawing Sheets

(56) References Cited

U.S. PATENT DOCUMENTS

| | | | |
|---|---|---|---|
| 2005/0198171 A1 | 9/2005 | Landsman et al. | |
| 2005/0256764 A1* | 11/2005 | Beaumont et al. | 705/14 |
| 2007/0016644 A1 | 1/2007 | Corona | |
| 2007/0226300 A1* | 9/2007 | Smith et al. | 709/206 |
| 2008/0071873 A1 | 3/2008 | Gross | |
| 2008/0299953 A1* | 12/2008 | Rao | 455/414.1 |
| 2009/0100183 A1 | 4/2009 | Lam et al. | |
| 2009/0157828 A1 | 6/2009 | Agrawal | |
| 2009/0214034 A1 | 8/2009 | Mehrotra et al. | |
| 2011/0179126 A1 | 7/2011 | Wetherell et al. | |
| 2012/0089686 A1* | 4/2012 | Meister | 709/206 |
| 2012/0165050 A1 | 6/2012 | Doni | |
| 2013/0166657 A1 | 6/2013 | Tadayon | |
| 2014/0074953 A1* | 3/2014 | Piazza | 709/206 |
| 2014/0095628 A1* | 4/2014 | Chandak | 709/206 |

OTHER PUBLICATIONS

"How do I send to (or exclude) certain email addresses when sending a campaign?" Sep. 24, 2012; http://kb.mailchimp.com/article/how-do-i-send-to-or-exclude-certain-email-addresses-when-sending-a-campaign.

"Exclude email address / recipient from Exchange 2010 dynamic distribution group" Dec. 10, 2011; http://serverfault.com/questions/211211/exclude-email-address-recipient-from-exchange-2010-dynamic-distribution-group.

"Excluding specific email addresses from a dynamic distribution group" Dec. 10, 2008; http://social.technet.microsoft.com/Forums/en-US/exchangesvrgenerallegacy/thread/71d8f697-7fe4-4f52-96c0-482060585604.

Microsoft Office Outlook 2007 Help—Manage Messages by Using Rules.

* cited by examiner

| Recipient Conflict Display - Message (HTML) | _ □ × |
|---|---|

| Message | Insert | Options | Format Text | Review | Add-Ins |
|---|---|---|---|---|---|

Config
About —12
Oops Mail 14       16    10

Send
  To   larry@company1.com; marisaivy@company2.com
  Cc
  Subject  Recipient Conflict Display Todd J. Cohen
VP of Business Development
Gatekeeper Solutions, Inc.

todd@gatekeepersolutionsinc.com

OopsMail

This message is intended for the use of the individual or entity to which it is addressed and may contain information that is privileged and/or confidential. If the reader of this message is not the intended recipient, or the employer or the agent responsible for delivering the message to the intended recipient, you are hereby notified that any dissemination, distribution, forwarding, or copying of this communication is strictly prohibited. If you have received this communication in error, please notify the sender immediately by email or telephone, and delete the original message immediately. Thank you for your cooperation.

18 — ◯ See more about: larry@company1.com

11:25 PM
7/15/2013

Add-Ins tab displayed with Oops Mail.

Displayed the Rule set up for add a Recipient Conflict

FIG. 17

Block list alert displayed with rule that's being violated "Recipient Conflict".

Block list alert with multiple violated rules being displayed.

Edit a Rule displayed.

FIG. 19

RECIPIENT CONTROL SYSTEM FOR ENSURING NON-CONFLICTING AND COMPREHENSIVE DISTRIBUTION OF DIGITAL INFORMATION AND METHOD THEREOF

FIELD OF THE INVENTION

The present invention relates to a system of controlling the appropriate recipients for receiving digital information. In particular, a system that allows a user to configure it to ensure distribution of digital information via electronic communications to non-conflicting recipients and/or to a comprehensive list of recipients in a group.

BACKGROUND OF THE INVENTION

Most communications among businesses and individuals now-a-days are transmission of digital information via electronic means, such as text messaging, emails, instant messaging, etc. With the increased use of electronic communications, there is an increased need for controlling and monitoring such use to avoid misdirection of communication. Oftentimes, electronic communication is sent to unintended recipients due to the address "auto-complete" feature of email, text or instant messaging programs. Other times, the sender simply inputs the wrong recipient's email address or phone number, and the wrong recipient thereby receives the electronic communication while the intended recipient does not.

If an electronic communication is sent to a wrong recipient, sometimes it may be inconsequential and one can ask the unintended recipient to ignore the electronic communication. This may not be possible if the sender does not realize the communication was sent to the wrong recipient or the unintended recipient does not notify the sender. Even though it is common practice to use a notice within an electronic communication requesting the recipient to delete and/or return the message if the recipient is not the intended recipient, not all unintended recipients do so. If the sender simply forgets to include an intended recipient in the list of recipients of a group, then it would be impossible to correct such a mistake.

If a recipient has a conflicting interest with the sender or one or more of the intended recipients of the communication and/or the communication contains sensitive or privileged information, then there may be a more dire consequence for misdirected electronic communication. Examples of conflicting parties are: an insurer and the insured; competing businesses; management and staff; parties involved in medical care who have differing interests; and opposing parties in a lawsuit. Sensitive information may contain privileged information, trade secrets, privacy data, confidential business, and confidential financial information.

Known prior art method prevents an electronic communication from ever being sent to an identified recipient by blocking the particular recipient in a sender's electronic communication program. However, this is not a sufficient or proper means to prevent error when it would be necessary to send such communication in certain instances because it prevents all electronic communications from being sent to such recipient.

Therefore, there is a need to provide a system and method of controlling, monitoring, detecting and preventing sending of electronic communications to a conflicting recipient or recipients or to one or more recipients that become unintended recipients as a result of the inclusion of another recipient in the list of recipients in the group. There is also a need to provide a system and method of controlling, monitoring, detecting, and preventing electronic communications from not being sent to an intended recipient.

SUMMARY OF THE INVENTION

The present invention provides a system for controlling, monitoring, detecting and preventing sending of electronic communications to an unintended recipient or recipients. The present invention also provides a system for controlling, monitoring, detecting and ensuring electronic communications are sent to all intended recipients.

The system may be set up to perform the following functions:

1. Never send an electronic communication to a particular recipient.
2. Never send an electronic communication to a recipient with a particular second level domain name.
3. Never send an electronic communication to a particular recipient if another recipient is also on the list of recipients.
4. Never send an electronic communication to a recipient unless another particular recipient is also on the list of recipients.
5. Never send an electronic communication to recipients with conflicting second level domain names.
6. Delete an electronic communication to a particular recipient or recipients from the system after it is sent.
7. Delete an electronic communication to a recipient or recipients having a particular second level domain name from the system after it is sent.
8. Send an electronic communication to a particular recipient only when it contains a single recipient.

The system and method of the present invention controls, monitors, detects and prevents distribution of electronic communications to conflicting recipient(s) when such electronic communication is being sent to one or more recipients. Conflicting recipients may be competitors, an insurer and the insured, management and staff, parties involved in medical care who have differing interests, opposing parties in a lawsuit, etc. Conflicting recipients may be identified based on various parameters, such as all or a portion of an email address, all or a portion of a phone number, all or a portion of other recipient identifying (or addressing) mechanism, or other parameters.

Once the conflicting recipient(s) is identified by the system based on certain parameters, the system prevents the electronic communication from being sent and provides a notice to the sender, administrator, supervisor and/or manager. If the sender has authorization, he/she is given the option to either allow the electronic communication to go through (override), or reject the electronic communication and correct the conflict. A sender who does not have authorization to override a conflict may require actions to be taken by an administrator, supervisor or manager.

The system and method of the present invention also controls, monitors, detects and prevents electronic communications from being sent if there is a missing intended recipient when such electronic communication is being sent to one or more recipients of a group. A missing recipient may be identified based on various parameters, such as all or a portion of an email address, all or a portion of a phone number, all or a portion of other recipient identifying (or addressing) mechanism, or other parameters.

Once the missing intended recipient is identified by the system, the system can prevent the electronic communication from being sent. A notice is provided to the sender, administrator, supervisor and/or manager, and the sender may take affirmative action to allow the electronic communication to go through by manually overriding such restriction or correct the problem by adding the missing intended recipient. If the sender has no authority to override, actions will have to be taken by the administrator, supervisor and/or manager.

The system and method of the present invention also controls, monitors, detects, and performs certain action to an electronic communication upon sending to a certain recipient.

The system allows a user to create one or more databases based on various parameters to identify conflicting and missing intended recipient relationships, identify blocked recipients and identify when certain actions is required. Instead of using databases, such parameters may also be stored in persistent storage and non-database files. The system may be implemented on a sender's end (e.g. within a sender's email program) or an intermediary (e.g. a central server). The system at a central server may be cloud-based or as a software-as a service and implemented to monitor multiple devices or platforms of a user (e.g. mobile and desktop devices). The system and method can be individually set up (e.g. within a user's smart phone or email program on a personal computing device) and/or as an enterprise-wise set up (e.g. at a central server by an administrator). The system and method may be an independent program or incorporated as part of a firewall solution, anti-virus solution or network security and privacy compliance solution such as Appriver, Appriver's Mail Extreme package, Microsoft® Forefront, etc. Reports can be generated for a user or for an administrator, supervisor or manager.

BRIEF DESCRIPTION OF THE DRAWINGS

Preferred embodiments of the present invention have been chosen for purposes of illustration and description and are shown in the accompanying drawings forming a part of the specification wherein:

FIG. 11 is a screen print of a computer monitor display by the system of the present invention as a plug-in of Microsoft® Outlook.

FIG. 14 is a screen print of a computer monitor display by the system of the present invention and illustrates the configuration for conflicting recipients.

FIG. 17 is a screen print of a computer monitor display by the system of the present invention and illustrates the notice to the user of a block and the option to override.

FIG. 19 is a screen print of a computer monitor display by the system of the present invention and illustrates the editing of a configuration for blocking a recipient.

DETAILED DESCRIPTION OF THE PREFERRED EMBODIMENTS

Figure 1:
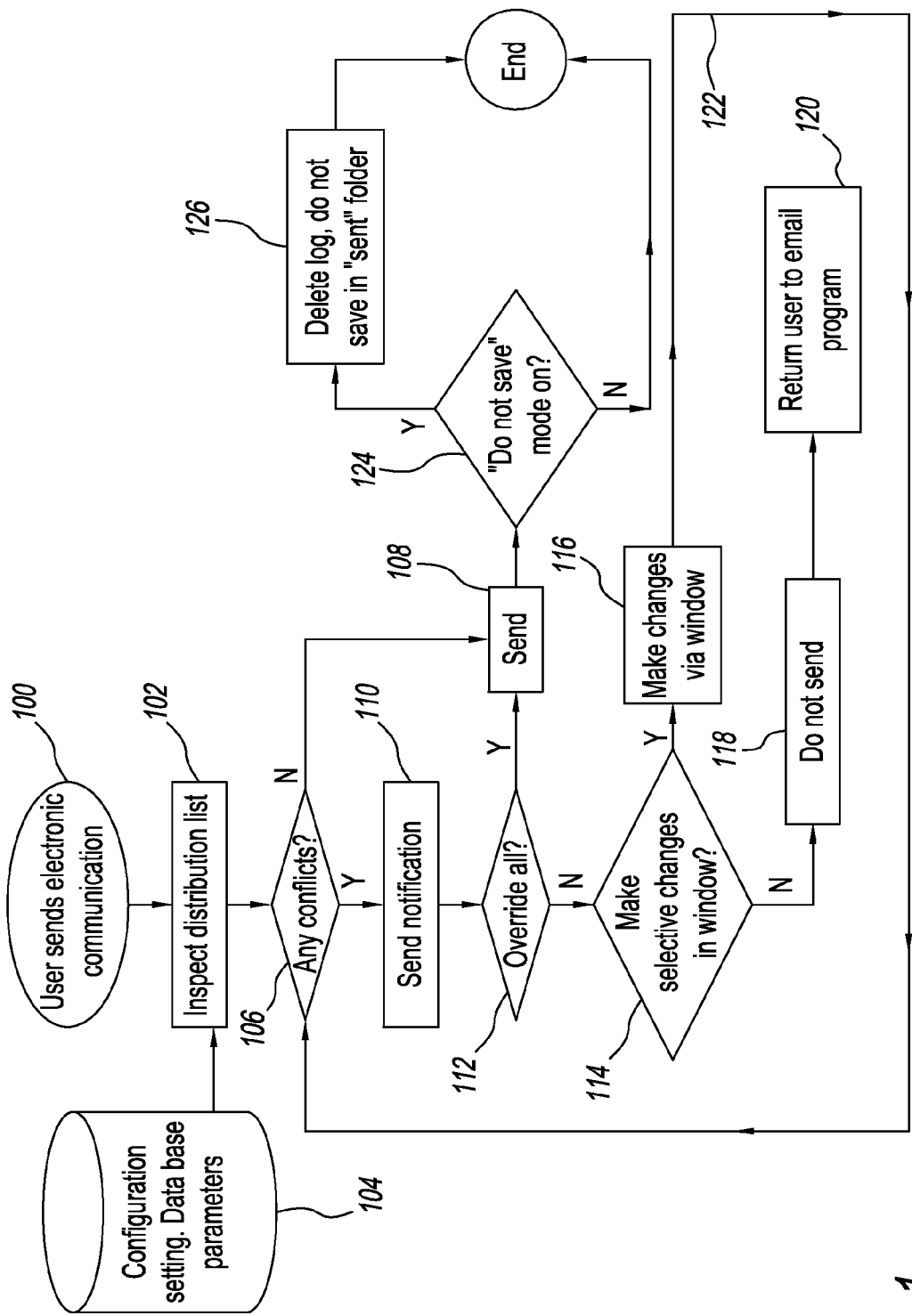
FIG. 1 shows a general application process of the present invention.

What the System Does:

The recipient control system of the present invention operates under three main categories: Conflicting Recipient(s), Missing Intended Recipient(s), and Action List. The system provides controlling, monitoring, detecting and taking certain action with respect to electronic communications under these categories.

Conflicting Recipient:

The recipient control system prevents the sending of digital information via electronic communication to a conflicting recipient or recipients. An individual recipient may be in conflict with the user/sender that requires a block; or one or more recipients may be conflicting vis-à-vis one or more of the other recipients requiring a block. An electronic communication to one or more conflicting recipients is blocked, yet the user may permit (if overriding is allowed) the electronic communication to be sent to one or more of the recipients. When a sender sends electronic communication to one or more recipients, the system examines and detects whether any one in the group of recipients is a prohibited recipient based on the identity of one or more of the other recipients based on predetermined parameters. If the system does not detect a conflict for any recipient or combination of recipients in the electronic communication, then the electronic communication is sent. Otherwise, the electronic communication is not sent.

Identifying Conflict Based on a Portion of a Phone Number:

Individuals from the same company or office usually have the same first three or four digits of their seven digit phone numbers (or equivalently, first seven or eight digits of their ten digit phone numbers). It is possible to identify conflicting recipients with parameters based on the area code and the Central Office (exchange) code of a phone number, which comprises the first three digits of a seven digit phone number (or equivalently, first seven digits of a ten digit phone number) under the North American Numbering Plan for telephone numbers. The fourth digit (or equivalently, the eighth digit) may be another parameter for consideration in identifying conflict to prevent over-inclusiveness. For example, everyone working at Company A has phone numbers that begin with 212-368-9xxx; everyone working at Company B, a competing business, may have phone numbers that begin with 201-555-8xxx. Similarly, an international phone number containing more digits or other numbering plans can be adapted or used to identify conflicting recipients. The countries code prefixes can also be used to identify conflicting recipients (e.g. no electronic communication to phone numbers that begin with the country code 98 for Iran).

Identifying Conflict Based on a Portion of an Email Address:

Individuals from the same company usually have email addresses with the same second level domain name. It is possible to identify conflicting recipients based on the second level domain name and identifying competing second level domain name. For example, anyrecipient@company1.com may be identified as being in conflict with anyrecipient@company2.com because Company 1 and Company 2 are competing businesses. The parameters may be set for *@company1.com being in conflict with *@company2.com with * being a wildcard string of characters (or they can be identified as *company1* and *company2* to include all top level domains of the second level domain, or other variations known to one skilled in the art). Another example, company3usa.com and company3japan.com are sister or affiliated companies, but either or both may be considered conflicting with either or both of a competitor's addresses, such as company4usa.com and/or company4japan.com for purposes of the system. The parameters for this example may be set for *@company3*.com and *@company4*.com as a conflicting pair. Another example, anyrecipient@board.company1.com as email addresses of board members may be identified as being in conflict with anyrecipient@company1.com (i.e. *@board.company1.com and *@company1.com as a conflicting pair). In the foregoing example, board members do not want their communications to go to non-board members.

Another example of the use of the present invention is when the parameter is set so that a sender is restricted to sending internal electronic communication within a company only, such as to anyrecipient@company4.com (i.e. only *@company4.com are non-conflicting). If such a sender includes in his distribution list of recipients an email address having a different second level domain name, then such electronic communication will not be sent. Similarly, if the sender is restricted to sending internal electronic communication only to his managers, the parameter may be set based on the sub-domain name such as anyrecipient@manager.company4.com (i.e. *@manager.company4.com).

Another example of identifying conflicting recipient based a portion of the email address is to set the parameters based on a country code top level domain name. For example, if a user is restricted from sending any electronic communication to Iran, the parameters may be set to anyrecipient@anydomain.ir (i.e. *.ir). The country code second level domain name can also be the parameters for identifying a conflict, such as anyrecipient@anydomain.gov.ir (i.e. *gov.ir) to block electronic communications from being sent to an Iranian governmental entity.

Identifying Conflict Based on Other Parameters of a Recipient's Contact Information:

Other parameters in a recipient's contact information, such as company name, title, position, etc. may also be used to identify conflicting recipients. For example, parameters may be set such that an electronic communication being sent to management of a company will be restricted from being sent to administrative staff of the company, other workers, non-managers, unionized workers, etc. For example, if Andy's contact information includes his title as "Manager," and Beatrice's contact information includes her title as "Staff-Secretary," a user may set up the parameter for a conflicting pair such that any electronic communication being sent to a recipient with the title "Manager" (i.e. Andy) cannot also be sent to a recipient with the title "Staff*" (i.e. Beatrice).

As another example, if Uncle Bob and Aunt Mary are estranged or otherwise do not speak with each other, and do not want to have anything to do with each other, a sender can set the parameter in Uncle Bob's contact information identifying Aunt Mary as a conflict, or vice versa. In this situation, if a sender tries to send an electronic communication to multiple recipients that include Uncle Bob and Aunt Mary, the system will notify the sender of such conflict and will not send the electronic communication out.

Conflict Identified:

Once all parameters are checked, if any conflict is identified, the system prevents the electronic communication from being sent. The sender is notified of such blocking and the rules/reasons for such blocking. The sender may be provided with one or more of the following options:

1. Delete the electronic communication;
2. Automatically or manually remove certain recipients and re-send the electronic communication;
3. Override the block and send the electronic communication as it if the sender has authority to override; or
4. If the sender does not have authority to override a block, then the user will await authorization from a supervisor, manager, etc. to approve the override.

Missing Intended Recipient:

The recipient control system prevents the sending of digital information via electronic communication to multiple recipients when an intended recipient may be missing. Two recipients may be a group such that electronic communication sent to one must include the other and vice versa. A group can also include more than two recipients. When a sender sends electronic communication to multiple recipients, the system examines and detects whether any recipient is missing from a group based on predetermined parameters. If the system does not detect a missing recipient in the electronic communication, then the electronic communication is sent. Otherwise, the electronic communication is not sent.

Identify Missing Intended Recipient Based on a Portion of an Email Address:

Individuals from the same company usually have email addresses with the same second level domain name. It is possible to identify missing intended recipients based on the second level domain name. For example, when a user sends an email to recipient1@company1.com, the user is required to send it to all other recipients in company1, such as anyrecipient@company1.com. Therefore, anyrecipient@company1.com is considered a group for recipient1@company1.com. The parameters may be set such the group for recipient1@company1.com is *@company1.com with * being a wildcard string of characters (or it can be identified as *company1*, to include all top level domains of the second level domain, or other variations known to one skilled in the art).

Individuals within the same company may have email addresses having different sub-domains. It is possible to identify missing intended recipients based on the sub-domain. For example, when a user sends an email to a board member of a company, member1@board.company1.com, the user is required to send it to all board members, such as anymember@board.company1.com (i.e. *@board.company1.com). This does not require tying in to a particular email address and by reviewing the sub-domain, it would be sufficient to cover all members on the board, whether specifically identified or not or later added.

Identify Missing Intended Recipient Based on Other Parameters of a Recipient's Contact Information:

Other parameters in a recipient's contact information, such as company name, title, position, etc. may also be used to identify missing intended recipients. For examples, an electronic communication being sent to management of a company must also include the corporate attorney; an electronic communication being sent to a husband/wife must also include the spouse; an electronic communication being sent to the court or judge must also include opposing counsel. For example, if Andy's contact information includes his title as "Manager," and Casey's contact information includes his title as "Attorney," a user may set up the parameter for a group that any electronic communication being sent to a recipient with the title "Manager" (i.e. Andy) must also include all recipients with the title "Attorney" (i.e. Casey).

As another example, if an insured requests the insurance company to copy the insured's attorney with all communications, the insurance company may set the parameters in connection with the insured's contact information that the insured's attorney is to be included. In this case, if a sender tries to send an electronic communication to the insured and the insured's attorney is not on the distribution list of recipients, the electronic communication will not be sent out. In this example, a user may set up the parameter for a group that any electronic communication being sent to the insured, perhaps identified in the user's address book as "Insured0001," must also include the insured's attorney, perhaps identified in the user's address book as "Attorney for Insured0001" by creating a group of recipients as *insured0001*.

Missing Intended Recipient Identified:

Once a missing intended recipient is identified, the system prevents the electronic communication from being sent. The sender is notified of such blocking and the reasons for not sending the electronic communication out. The sender may be provided with one or more of the following options:

1. Delete the electronic communication;
2. Automatically or manually add the missing intended recipients and re-send the electronic communication;
3. Override the block and send the electronic communication as is if the sender has authority to override; or
4. If the sender does not have authority to override a block, then the user will await authorization from a supervisor, manager, etc. to approve the override.

Databases for Identifying Conflicting and Missing Intended Recipient Relationship:

The system identifies conflicting and missing intended recipient relationships based on parameters set up by a user and/or a system administrator. The system provides an interface for the user and/or system administrator to input such parameters. Such parameters are saved and stored by the system in a database file, persistent storage or other media known to one skilled in the art.

Figure 9:
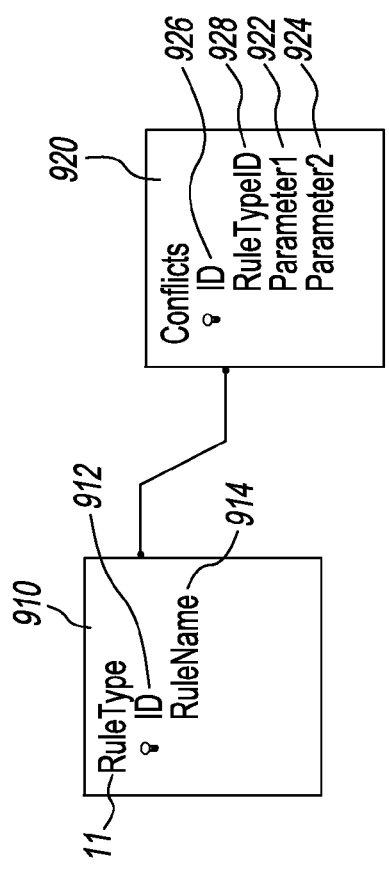
FIG. 9 shows a database structure of the system of the present invention using relational data.

FIG. 9 illustrates the use of relational data with two databases 910 and 920 for storing such parameters. Database 910 lists the type of rules "RuleType" 911 available in the system, such as conflicting recipient, conflicting recipients, blocking recipient, group, etc. Each rule may be assigned an identification number "ID" 912 and given a name "RuleName" 914 to facilitate access by the system and the user. Database 920 is for the "RuleName" "Conflicts" for conflicting recipients. A user input the information for the parameters, such as "Parameter1" 922 and "Parameter2" 924. Database 920 can include multiple sets of "Conflicts" with each set of conflicting recipients assigned an identification number "ID" 926 and given a reference "Rule TypeId" 928. As known by one skilled in the art, multiple relational databases will be used to accommodate all the parameters set up by the user and/or system administrator.

Figure 10:
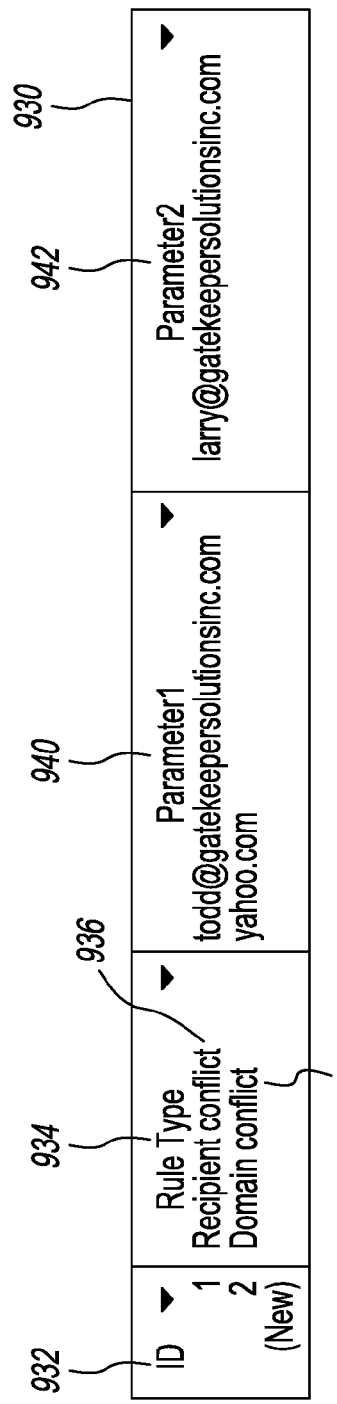
FIG. 10 shows a database structure of the system of the present invention using a flat file database.

FIG. 10 illustrates the use of a flat file database 930 wherein the first column contains an unique identification number "ID" 932 assigned to each set of parameters. The second column contains the relevant rules "RuleType" 934 such as "Recipient Conflict" 936 and "Domain Conflict" 938. The third, fourth, and Nth columns contain parameters input by the user and/or system administrator for, respectively, "Parameter1" 940, "Parameter2" 942, . . . "ParameterN". As shown in FIG. 10, under rule ID #1, todd@gatekeepersolutionsinc.com and larry@gatekeepersolutionsinc.com are identified as a conflicting pair of recipients such that the system prevents an electronic communication to both Todd and Larry from being sent. Under rule ID #2, yahoo.com is identified as a domain conflict such that the system prevents electronic communications from being sent to any email address with the yahoo.com domain such as *@yahoo.com. The file database 930 may take the form of a Microsoft® Excel spreadsheet, an xml file, a simple database table, or other forms known to one skilled in the art.

The system may be set up to perform one or more of the following functions:

1. may only send if a recipient is listed in the system, which may be created or imported from a user's address book or contact list or set up by a system administrator.
2. may not send if a recipient is not listed in the system.
3. may not send if a recipient is identified as being blocked (i.e. individual recipient conflict).
4. may only send if a recipient's email address has a specific second level domain name that is listed in the system.
5. may not send if a recipient's email address has a specific second level domain name that is listed in the system.
6. may not send if a recipient's email address has a specific second level domain name that conflicts with another specific second level domain name.
7. may only send if a recipient's relationship list of required recipients (i.e. group) are all included in the distribution list of recipients.
8. may not send if a recipient's relationship list of required recipients (i.e. group) are not all included in the distribution list of recipients.
9. if the distribution list of recipients includes a recipient with an email address having a specific second level domain name, the electronic communication may only be sent if the distribution list of recipients includes all other email addresses with the same second level domain name in the system.
10. if the distribution list of recipients includes a recipient with an email address having a specific second level domain name, the electronic communication may only be sent if the distribution list of recipients includes all other email addresses with a particular, different, second level domain name in the system.
11. if the distribution list of recipients includes a recipient with an email address having a specific sub-domain name and second-level domain name, the electronic communication may only be sent if the distribution list of recipients includes all other email addresses with the same sub-domain name and second-level domain name in the system.

The above list of functions is non-exhaustive and many variations to the functions are contemplated by the system.

Although the parameters for the system has been described above as requiring input or set up by a user or a system administrator, it is contemplated that the system can also be self-learning. For example, if two specific email addresses have been identified as conflicting pairs (e.g. amy@abc.com and bob@xyz.com), and after the user identifies a few (for example, 3) other conflicting pairs of email addresses having the same two corresponding second level domain names (e.g. casey@abc.com and danny@xyz.com; jack@abc.om and joe@xyz.com; and lily@abc.com and jill@xyz.com), the system automatically creates the second level domain name conflicting pairs for *@abc.com and *@xyz.com. Similarly, after a user overrides certain predetermined parameters for a rule a certain number of times, the system may automatically updated to remove the rule.

Action List:

The recipient control system takes certain actions when digital information is sent via electronic communication. When a sender sends electronic communication to a particular recipient, the system examines and detects whether any required action needs to be taken based on predetermined parameters. If the system detects any required action, a notification is provided to the user before or after sending.

Deleting Electronic Communication After Sending:

After an electronic communication is sent, a user sometimes does not want to keep a copy of the electronic communication. The system can be set up so that all electronic communications sent to one or more particular recipients would be deleted from the system after it is sent. Such electronic communication would not be kept in the "Sent" folder nor in the "Trash" folder.

This feature is particularly useful for preserving law firms' attorney-client privileged communication, especially when copies of such communication may reside in a third party's server or storage for an indefinite period of time.

Implementation of the System:

The recipient control system may be incorporated as a feature, or as an add-on, or as a plug-in to existing software or program. For example, the system can be an integrated part of, or added as an add-on to an electronic mail program such as Microsoft® Outlook, as a plug-in or add-on to existing features of an electronic mail program such as Microsoft® Outlook, as a plug-in to an internet browser for accessing web-based electronic mail, or as a cell phone texting feature. Although Microsoft® Outlook program is specifically mentioned herein, the system of the present invention may be added as an add-on or plug-in to other electronic mail programs such as Apple's mail program, Google® gmail, Yahoo!® mail, and other electronic mail programs, texting programs, instant messaging programs, social media distribution or blogging such as Twitter handles, Facebook accounts, now known or develop in the future.

Implementation of the system is not limited to personal messaging client, but can also be implemented on a central server, such as a corporate server, or a third party intermediary in the cloud. The system in a central server may be cloud-based or as a software-as-a-service that serves multiple devices or platforms of one or more users. The system and method may be an independent program or incorporated as part of a firewall solution, anti-virus solution or network security and privacy compliance solution such as Appriver, Appriver's Mail Extreme package, Microsoft® Forefront, etc. Depending on how the system is implemented, the different parameters for identifying conflict or missing intended recipients and the action list may be set up by the sender or by an administrator. If the parameters are set up by an administrator, the administrator may restrict any overriding by the sender or leave it unrestricted to allow a sender to override the block. Alternatively, the overriding may require approval from an administrator and an automatically generated electronic communication may be sent to the administrator requesting such approval.

The system may be installed onto a user's computer system via online download from a secured website, or via a physical compact disc. The system may reside in a user's personal computer or at a server remote from the user or in the cloud. If the system does not reside locally at the user's personal computer, then a secured interface may be installed in the user's personal computer to allow remote access of the system via the internet or local area network.

Once the system is installed and available for use, the system allows the user to set up the parameters for the various rules available in the system. The parameters for each rule are stored in storage such as database(s), persistent storage or other types of files.

In operation, the system applies to all outgoing electronic communication, even though a sender may be responding to an electronic communication that originates from a third party by replying "all." The system checks all outgoing electronic communication against the parameters set up by the user, and provides a warning if a problem is detected or takes the necessary action based on those parameters.

The system may monitor and log each occurrence when an outgoing electronic communication is blocked or an action is contemplated. Reports may also be generated for a user and/or an administrator identifying one or more of the following information: sender's information, date and time the electronic communication was sent, the complete list of recipients, reasons the electronic communication was not sent initially (e.g. identifying the particular rule being violated), actions taken by the sender after the notification, etc. Such report can aid in the user and/or administrator in modifying or fine tuning the parameters for better and more efficient performance of the system.

DETAILED DESCRIPTION OF THE FIGURES

Referring to FIG. 1, which illustrates an example of the application process of the present invention, a user sends an electronic communication at 100. At 102, the distribution list of recipients of the electronic communication is inspected based on the configuration, setting and/or database parameters at 104. If a conflict or missing recipient is not identified at 106, the electronic communication is sent out at 108. If one or more conflicts or missing recipient is/are identified at 106, the electronic communication is not sent out and a notification/warning is provided to the user at 110 that includes the full list of rules that would be violated by the communication. The user is provided with the option at 112 to override all rules that would be violated by the proposed communication and thereby send the communication at 108, or the option to make selective changes to the proposed communication at 114 by either deleting certain recipients at 116, and/or changing certain recipients at 116. If the user neither overrides all rules nor makes selective changes, the user is given the option to either prevent the sending of the communication at 118 and to return to the email program at 120 in order to either delete the entire proposed electronic communication or make changes within the email program. If the user corrects the violation(s) or make changes at 116, the electronic communication will again be subjected to the process via path 122 and be re-inspected at 106. During re-inspection, the notification still lists all violated rules (even those a user has decided s/he will override) and the user must still elect to override those rules after the re-inspection. Inspections are performed over all addresses in the distribution lists (including "to," "cc," and "bcc") applying all rules that have been entered. After sending the communication, the system will determine at 124 if the "do not save" mode has been selected by the user and, if so, the system will, at 126 delete the email from the sent folder, the deleted mail folder, and the user's log. The system may be set up for other actions to occur at 124 with respect to the recipients after the communication is sent or, alternatively, before the communication is sent.

Figure 2:
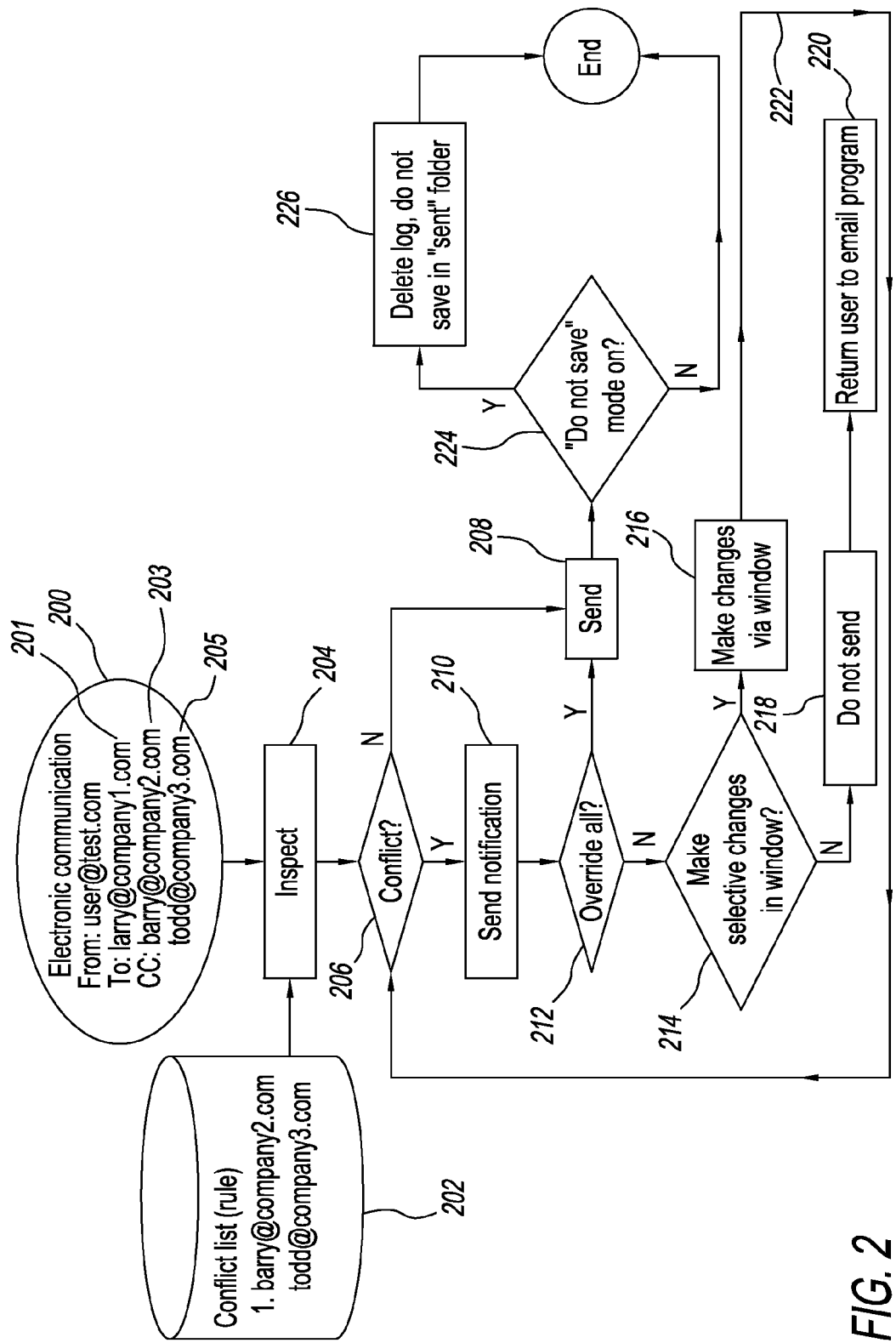
FIG. 2 shows a recipient's email conflict process of the present invention.

Referring to FIG. 2, which illustrates an example of a recipient's email conflict process of the present invention, a user sends an electronic communication at 200 to three recipients 201, 203, and 205, each with a different email address. The system inspects the electronic communication at 204 based on the parameters at 202. The system compares the distribution list of recipients 201, 203, and 205 with the conflicting pair of recipients based on their email addresses. The parameters at 202 identify the email addresses of recipient 203 and recipient 205 as a conflicting pair. Since a conflict (i.e. rule violation based on the parameters) is identified at 206, the electronic communication is not sent out and a notification and warning is provided to the user at 210 that identifies the rule defined by two conflicting recipients. The user is provided with the option at 212 to override the rule being violated by the proposed communication and thereby send the communication at 208, or the option to make selective changes to the proposed communication at 214 by making changes at 216 such as either deleting a recipient and/or changing a recipient at 216. If the user neither overrides the rule nor makes selective changes, the user is given the option to prevent the sending of the communication at 218 and to return to the email program at 220 in order to either delete the entire proposed communication or to make changes in the email program. After correcting the violation or making changes at 216, the electronic communication will again be subjected to the process via path 222 and be re-inspected at 206. After sending the communication, the system will determine at 224 if the "do not save" mode has been selected by the user and, if so, at 226 the system will delete the email from the sent folder, the deleted mail folder, and the user's log.

Figure 3:
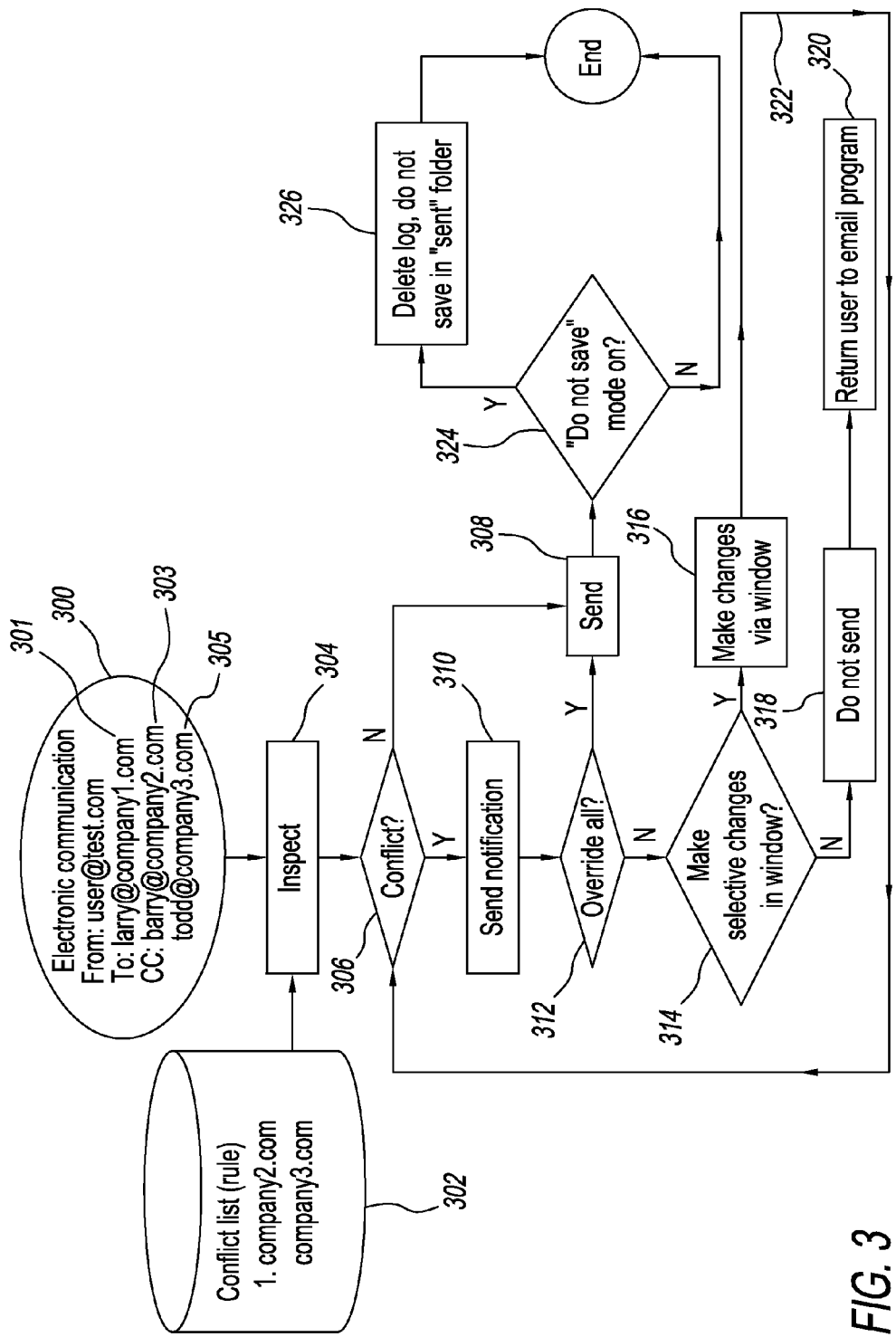
FIG. 3 shows a recipient's second-level domain name conflict process of the present invention.

Referring to FIG. 3, which illustrates an example of a recipient's second level domain name conflict process of the present invention, a user sends an electronic communication at 300 to three recipients 301, 303, and 305, each with a different email address including a different second level domain name. The system inspects the electronic communication at 304 based on the parameters at 302. The system compares the distribution list of recipients 301, 303, and 305 with the conflicting pair of recipients based on their second level domain names. The parameters at 302 identify the second level domain names of recipient 303 and recipient 305 as a conflicting pair. Since a conflict (i.e. rule violation based on the parameters) is identified at 306, the electronic communication is not sent out and a notification and warning is provided to the user at 310 that identifies the rule defined by two conflicting second level domain names. The user is provided with the option at 312 to override the rule being violated by the proposed communication and thereby send the communication at 308, or the option to make selective changes to the proposed communication at 314 by making changes at 316 such as either deleting a recipient and/or changing a recipient at 316. If the user neither overrides the rule nor makes selective changes, the user is given the option to prevent the sending of the communication at 318 and to return to the email program at 320 in order to either delete the entire proposed communication or to make changes in the email program. After correcting the violation or making changes at 316, the electronic communication will again be subjected to the process via path 322 and be re-inspected at 306. After sending the communication, the system will determine at 324 if the "do not save" mode has been selected by the user and, if so, at 326 the system will delete the email from the sent folder, the deleted mail folder, and the user's log.

Figure 4:
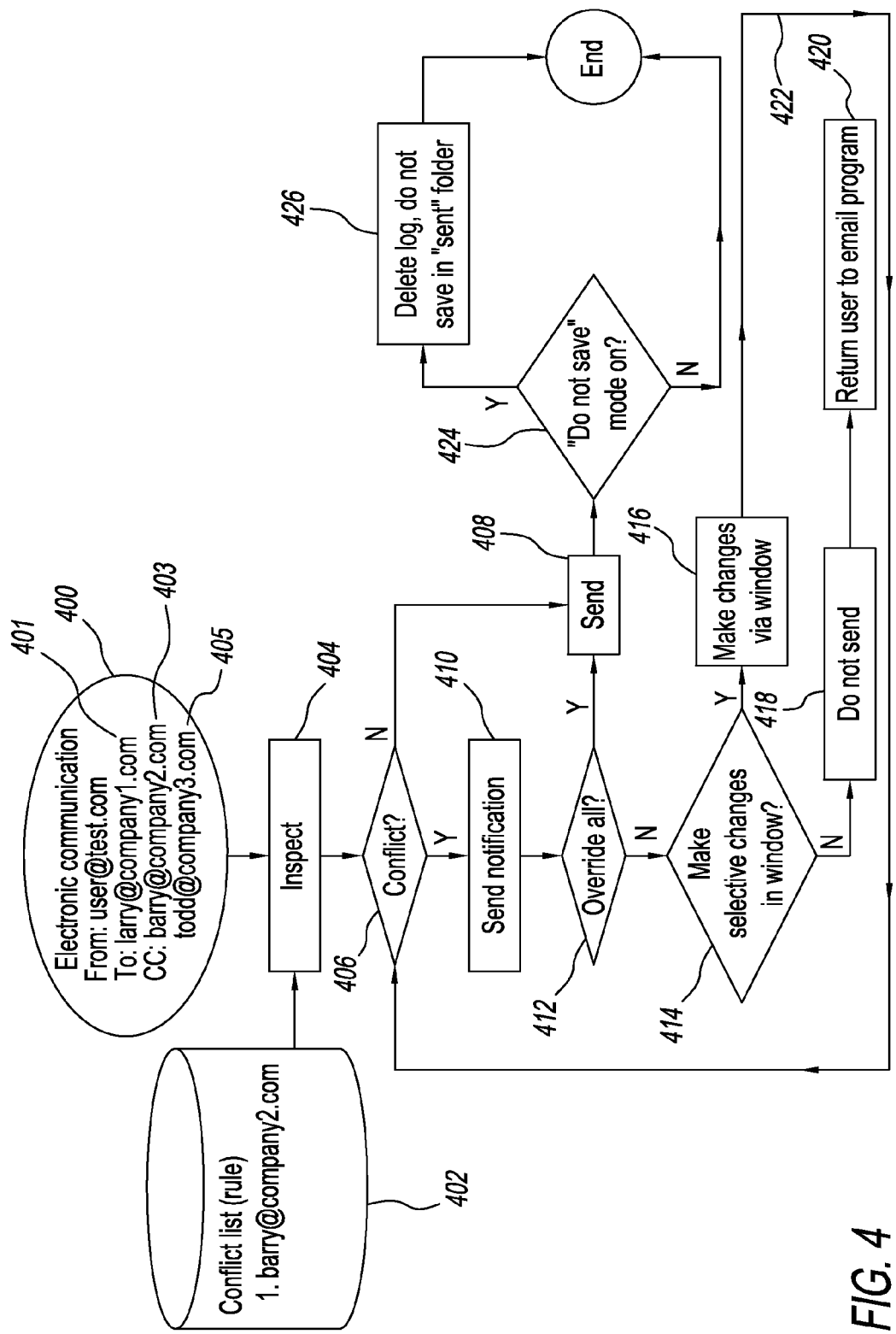
FIG. 4 shows a recipient's email block process of the present invention.

Referring to FIG. 4, which illustrates an example of a recipient's email block process (i.e. individual recipient conflict) of the present invention, a user sends an electronic communication at 400 to three recipients 401, 403, and 405, each with a different email address. The system inspects the electronic communication at 404 based on the parameters at 402. The parameters at 402 identify the email address of recipient at 403 as being blocked (i.e. individual recipient conflict). Since a block (i.e. rule violation based on the parameters) is identified at 406, the electronic communication is not sent out and a notification and warning is provided to the user at 410 that identifies the rule defined by a blocked address. The user is provided with the option at 412 to override the rule being violated by the proposed communication and thereby send the communication at 408, or the option to make selective changes to the proposed communication at 414 by making changes at 416 such as changing the recipient. If the user neither overrides the rule nor makes selective changes, the user is given the option to prevent the sending of the communication at 418 and to return to the email program at 420 in order to either delete the entire proposed communication or to make changes in the email program. After correcting the violation or making changes at 416, the electronic communication will again be subjected to the process via path 422 and be re-inspected at 406. After sending the communication, the system will determine at 424 if the "do not save" mode has been selected by the user and, if so, at 426 the system will delete the email from the sent folder, the deleted mail folder, and the user's log.

Figure 5:
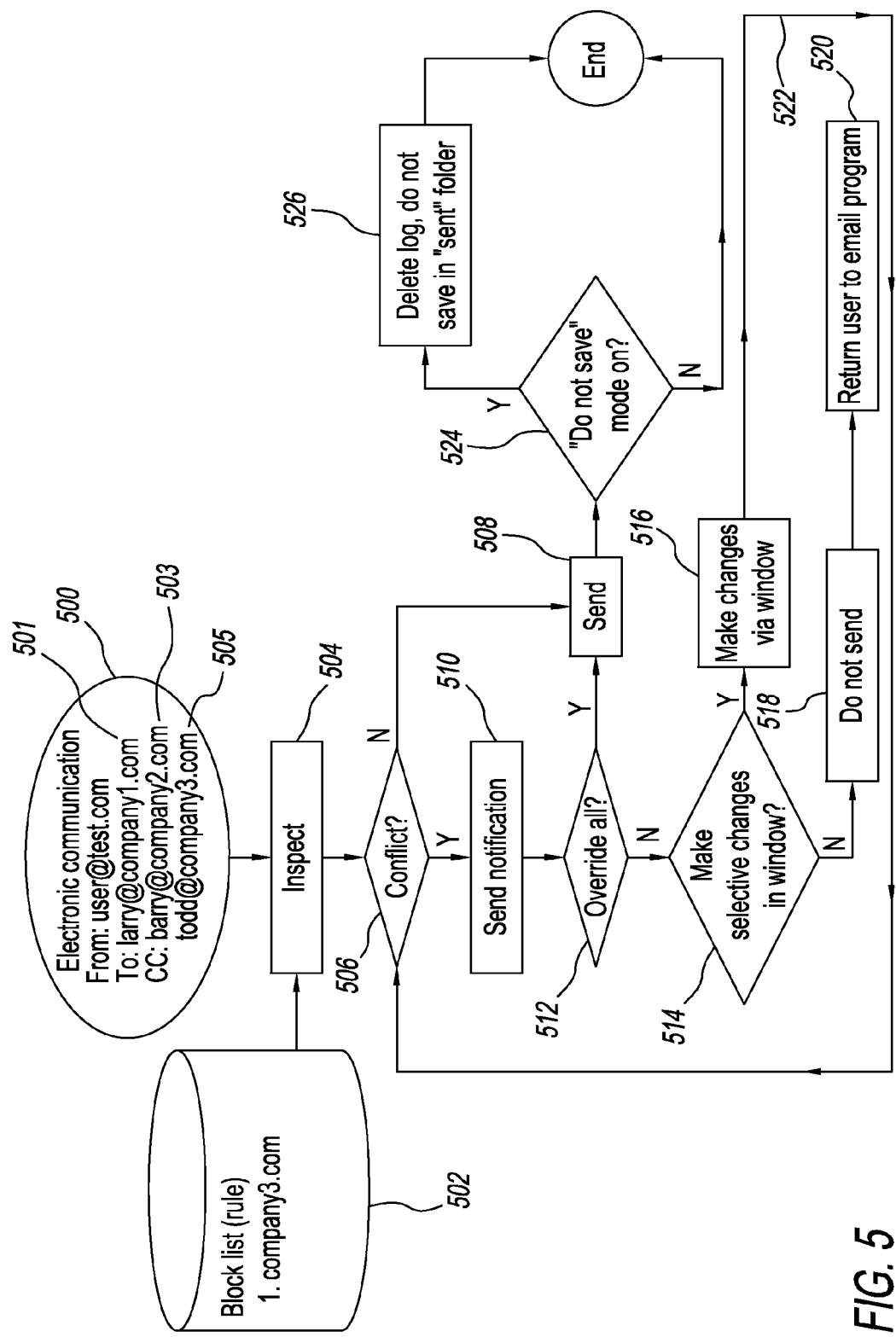
FIG. 5 shows a recipient's second-level domain name block process of the present invention.

Referring to FIG. 5, which illustrates an example of a recipient's second level domain name block process (i.e. individual second-level domain name conflict) of the present invention, a user sends an electronic communication at 500 to three recipients 501, 503, and 505, each with a different email address including a different second level domain name. The system inspects the electronic communication at 504 based on the parameters at 502. The parameters at 502 identify the second level domain name of recipient 503 as being blocked. Since a block (i.e. rule violation based on the parameters) is identified at 506, the electronic communication is not sent out and a notification and warning is provided to the user at 510 that identifies the rule defined by a blocked second level domain name. The user is provided with the option at 512 to override the rule being violated by the proposed communication and thereby send the communication at 508, or the option to make selective changes to the proposed communication at 514 by making changes at 516 such as changing the recipient. If the user neither overrides the rule nor makes selective changes, the user is given the option to prevent the sending of the communication at 518 and to return to the email program at 520 in order to either delete the entire proposed communication or to make changes in the email program. After correcting the violation or making changes at 516, the electronic communication will again be subjected to the process via path 522 and be re-inspected at 506. After sending the communication, the system will determine at 524 if the "do not save" mode has been selected by the user and, if so, at 526 the system will delete the email from the sent folder, the deleted mail folder, and the user's log.

Figure 6:
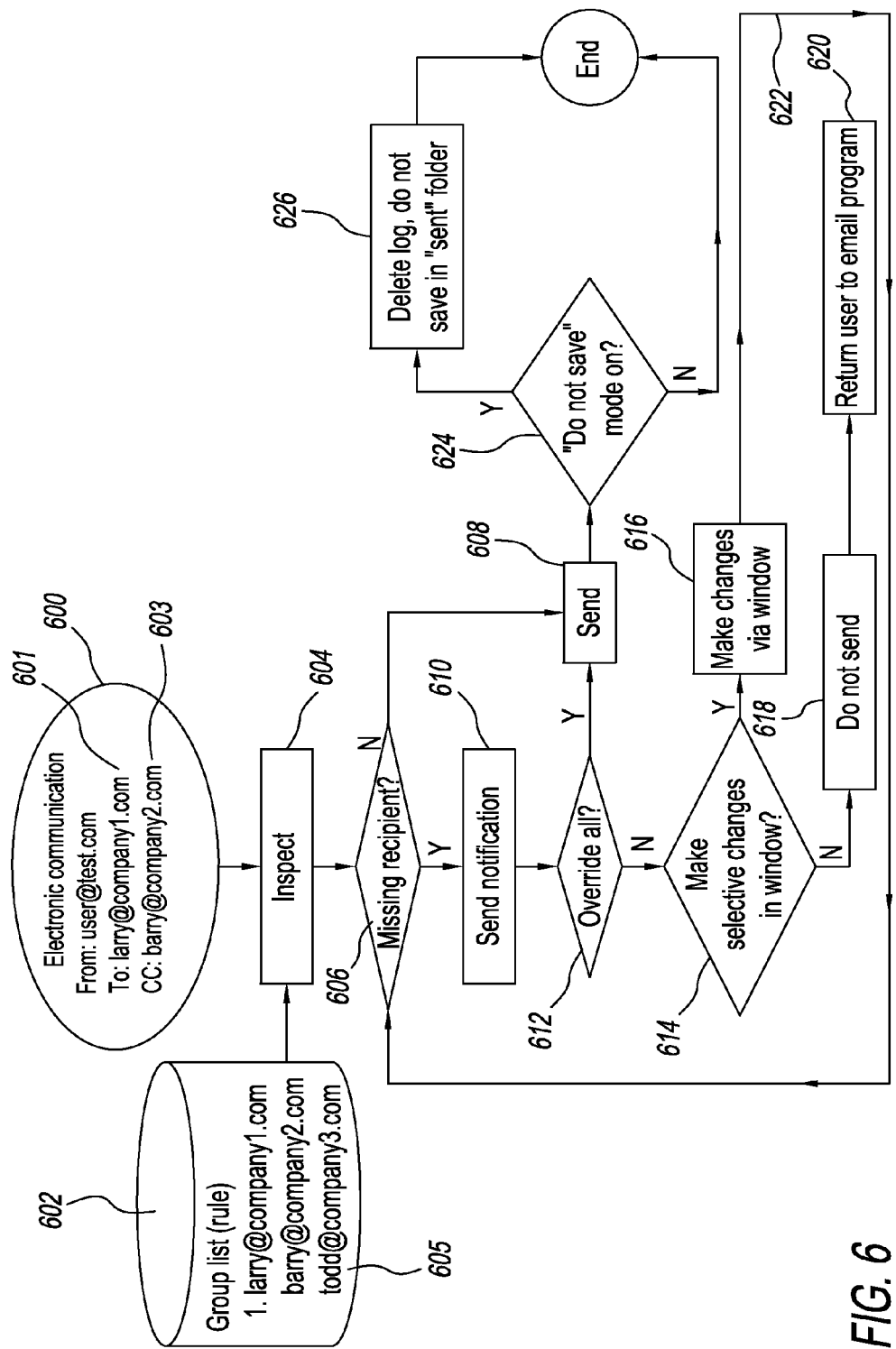
FIG. 6 shows a missing intended recipient process of the present invention.

Referring to FIG. 6, which illustrates an example of a missing intended recipient process of the present invention, a user sends an electronic communication at 600 to two recipients 601 and 603. The system inspects the electronic communication at 604 based on the parameters at 602. The parameters at 602 identify recipients 601 and 603 as part of a group (i.e. electronic communication sent to one must include every recipient in the group) which group includes 605. Since a missing intended recipient is identified at 606, the electronic communication is not sent out and a notification and warning is provided to the user at 610 that identifies the rule defined by a group. The user is provided with the option at 612 to override the rule being violated by the proposed communication and thereby send the communication at 608, or the option to make selective changes to the proposed communication at 614 by making changes at 616 such as adding the recipient. If the user neither overrides the rule nor makes selective changes, the user is given the option to prevent the sending of the communication at 618 and to return to the email program at 620 in order to either delete the entire proposed communication or to make changes in the email program. After correcting the violation or making changes at 616, the electronic communication will again be subjected to the process via path 622 and be re-inspected at 606. After sending the communication, the system will determine at 624 if the "do not save" mode has been selected by the user and, if so, at 626 the system will delete the email from the sent folder, the deleted mail folder, and the user's log.

Figure 7:
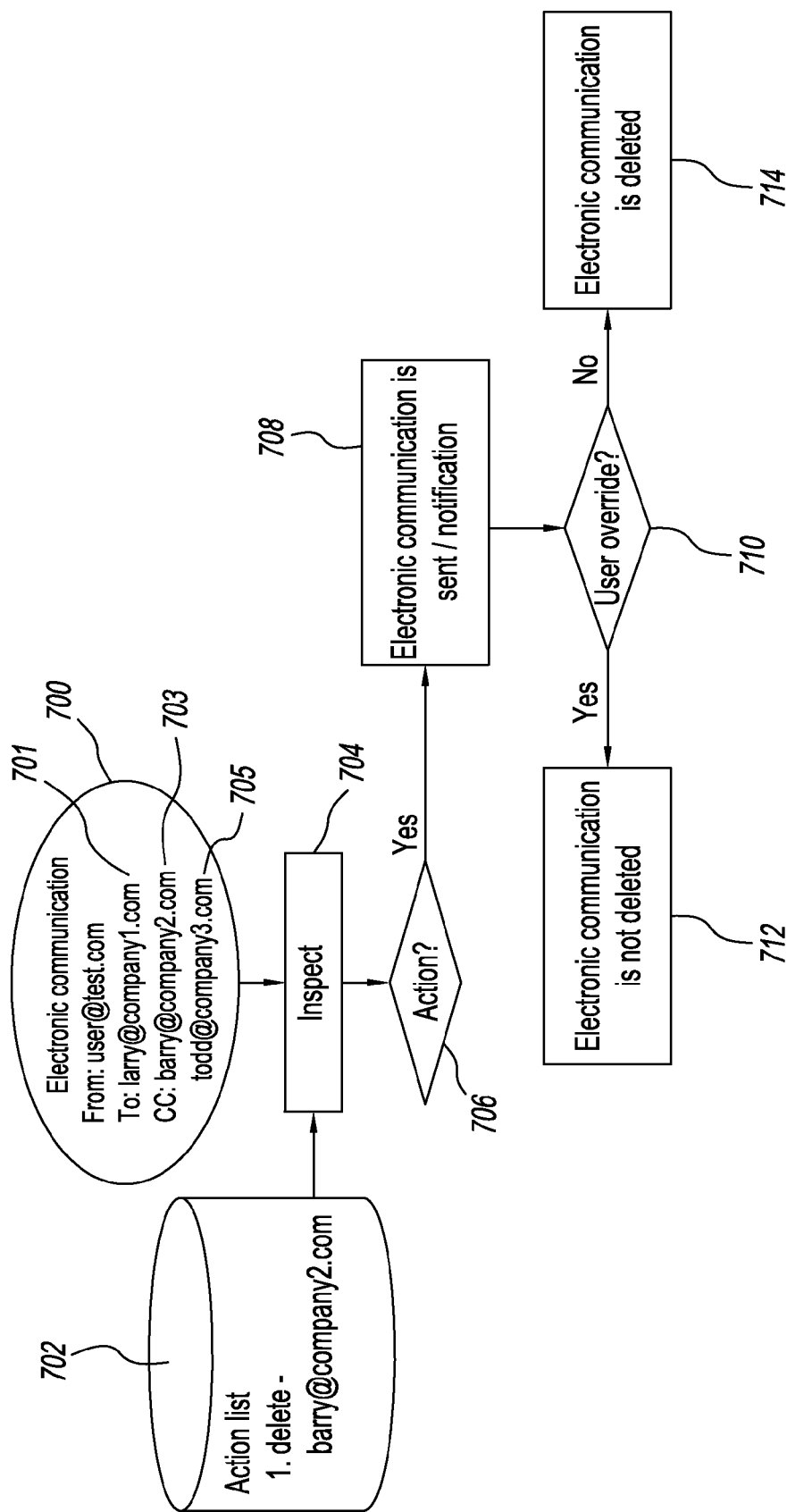
FIG. 7 shows a recipient's email address as being identified with the action of deleting the electronic communication after it is sent.

Referring to FIG. 7, which illustrates an example of a recipient's email address being identified with certain action of the present invention, a user sends an electronic communication at 700 to three recipients 701, 703 and 705, each with a different email address. The parameters at 702 identify the email address of recipient 703 as being identified with the action of deleting the electronic communication after it is sent. The system inspects the electronic communication at 604 based on the parameters at 702. The system compares the distribution list of recipients 701, 703 and 705 with the email address on the action list. Since the action of deleting is identified at 706, notification is given to the sender that the electronic communication is sent and will be deleted at 708. If the user with authorization overrides the deletion at 710, the electronic communication is not deleted at 712. If the user does not override the deletion at 710, the electronic communication is deleted at 714 from the system, including the sent item folder, deleted item folder, etc.

Figure 8:
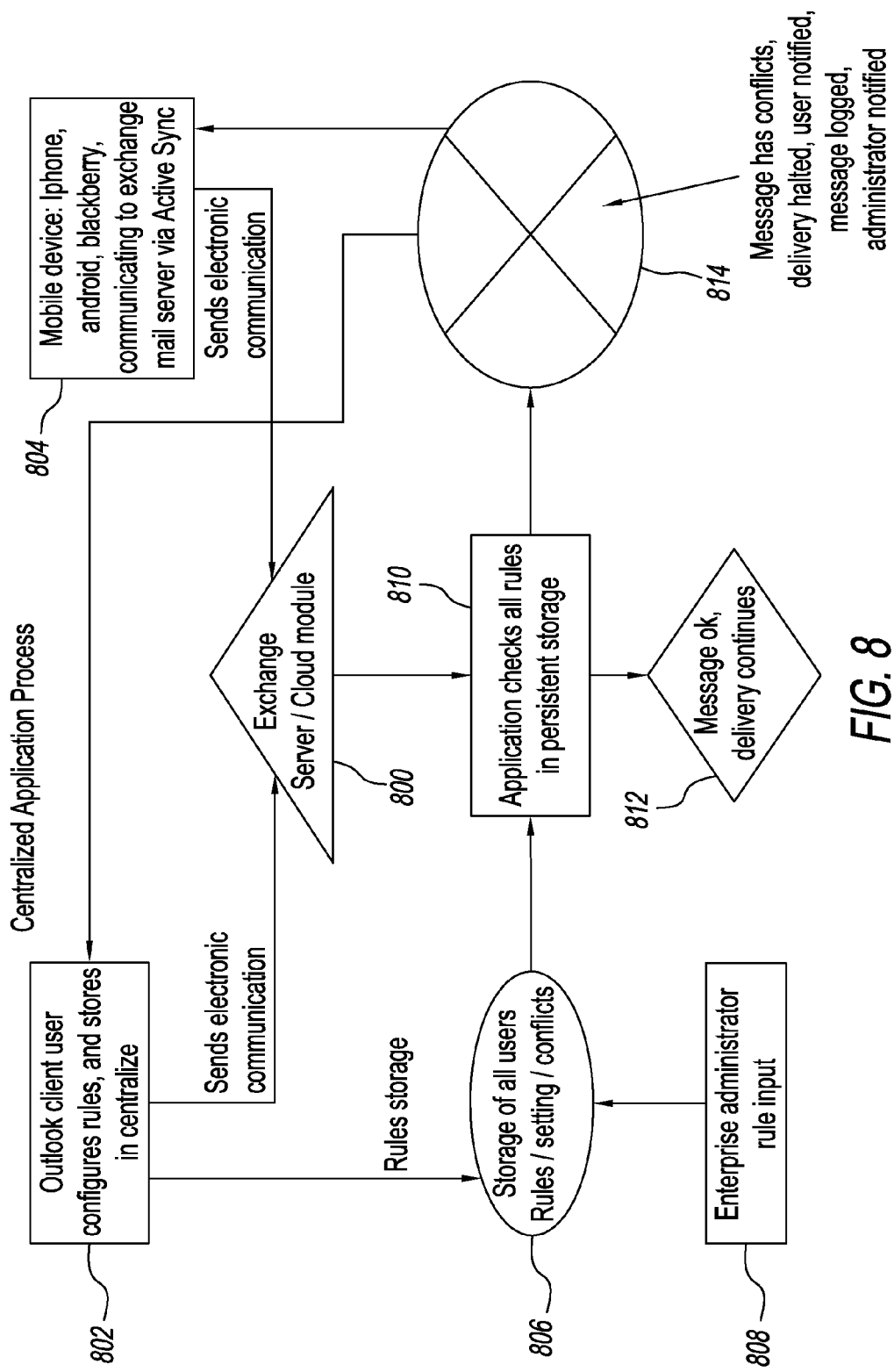
FIG. 8 shows a centralized application process of the present invention.

FIG. 8 illustrates an example of a centralized application process of the present invention wherein a user utilizes both a computer system 802 and a mobile device 804. This centralized application process utilizes a central server at 800, e.g. a Microsoft® Exchange server or other cloud-based server. A user can configure and identify various conflicting, blocking, or action parameters via the computer system at 802. The parameters are stored at 806, which may be a database, persistent storage or other type of files. The parameters stored at 806 may include more than one user's configuration, whether each user's configuration is unique or the same as other users. An administrator at 808 may access the stored parameters 806 for further configuration and generating reports. When a user sends an electronic communication at 802, it goes to the central server at 800, and then the system inspects the electronic communication at 810 by comparing it with the parameters stored at 806. If there is no conflict, blocking or action to be taken, the electronic communication is sent at 812. If there is a conflict, blocking or action to be taken, a notification at 814 is provided to the user and an event log is created and recorded in the system. Different options may be provided at 814 as described in connection with FIGS. 2-7 after a conflict, block or action is detected. Similarly for the user using a mobile device to send the electronic communication at 804, it goes to the central server at 800 (via ActiveSync if a Microsoft® Exchange server is used at 800) and then the system inspects the electronic communication at 810 by comparing it with the parameters stored at 806. The process after 810 for the user using a mobile device at 805 is the same as for the user using a computer system at 802.

Although FIGS. 2-7 each illustrates a single rule is being detected by the system, the system checks for all the parameters set up in the system. Each recipient of an electronic communication (whether the recipient is the direct recipient ("To") or a copied recipient ("cc" or "bcc")) is scrutinized by the system and compared to all the parameters. When multiple violations are detected, the user is notified of each violation, whether simultaneously or sequentially upon resolution of each violation.

FIGS. 11-19 show an embodiment of the system of the present invention, called Oops Mail, as a plug-in of Microsoft® Outlook on a personal computer. Once the system is installed as a plug-in to Microsoft® Outlook, it appears under the Add-ins Tab 10 of Outlook as shown in FIG. 11. At the Oops Mail Add-ins Tab 12, there is an option called "Config," which is for the configuration of Oops Mail.

Figure 12:
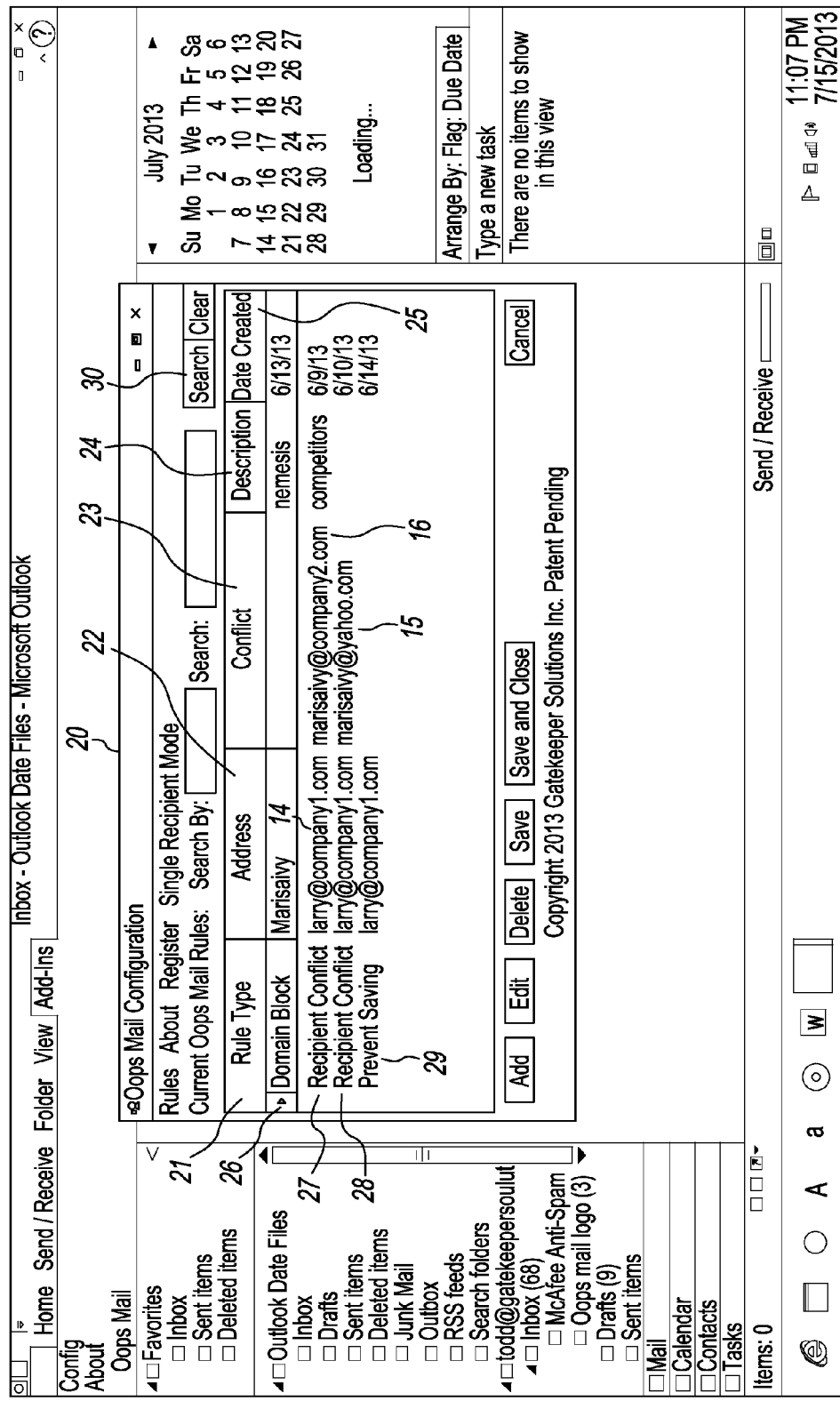
FIG. 12 is a screen print of a computer monitor display by the system of the present invention and illustrates the main configuration screen.

When the user clicks onto "Config," a "Configuration" dialog box 20 appears as shown in FIG. 12. The dialog box 20 allows the user to choose ("Add" or "Edit") the "Rule Type" 21 and input the parameters under "Address" 22 and "Conflict" 23 and identify it with a "Description" 24. Once a row is completed, the "Date Created" 25 is the date the parameters are saved for a particular "Rule Type." Under the first row 26, a "Domain Block" is set up for marisaivy such that any email to *marisaivy* will be blocked. Under the second row 27, a "Recipient Conflict" is set up for recipient 14 and recipient 16 such that any email listing both recipients 14 and 16 will be blocked. Under the third row 28, another "Recipient Conflict" is set up for recipient 14 and recipient 15, marisa@yahoo.com, such that any email listing both recipients 14 and 15 will be blocked. Under the fourth row 29, the "Prevent Saving" action is set up for recipient 14 such that any email sent to recipient 14 will not be saved in the "Sent" folder nor the "Deleted" folder. Any rows can be chosen for editing ("Edit") or deletion ("Delete"). The information shown in the Configuration dialog box 20 can be sorted and filtered as desired by the user to facilitate review of the parameters.

Referring to FIG. 11, an email is shown as being composed by the user Todd J. Cohen to recipient 14, larry@company1.com, and recipient 16, marisa@company2.com. Upon typing in recipient 14 in the "To" field, a preliminary notice 18 appears adjacent the email message near the bottom advising the user that there is more information specifically related to recipient 14. If the user clicks on such preliminary notice 18, it will bring up the relevant configurations related to recipient 14 (e.g. Configuration dialog box 20 of FIG. 12 filtered to show only rows 27, 28 and 29). Similarly, when the user types in recipient 16 in the "To" field, a second preliminary notice (not shown) may appear as related to recipient 16.

Figure 13:
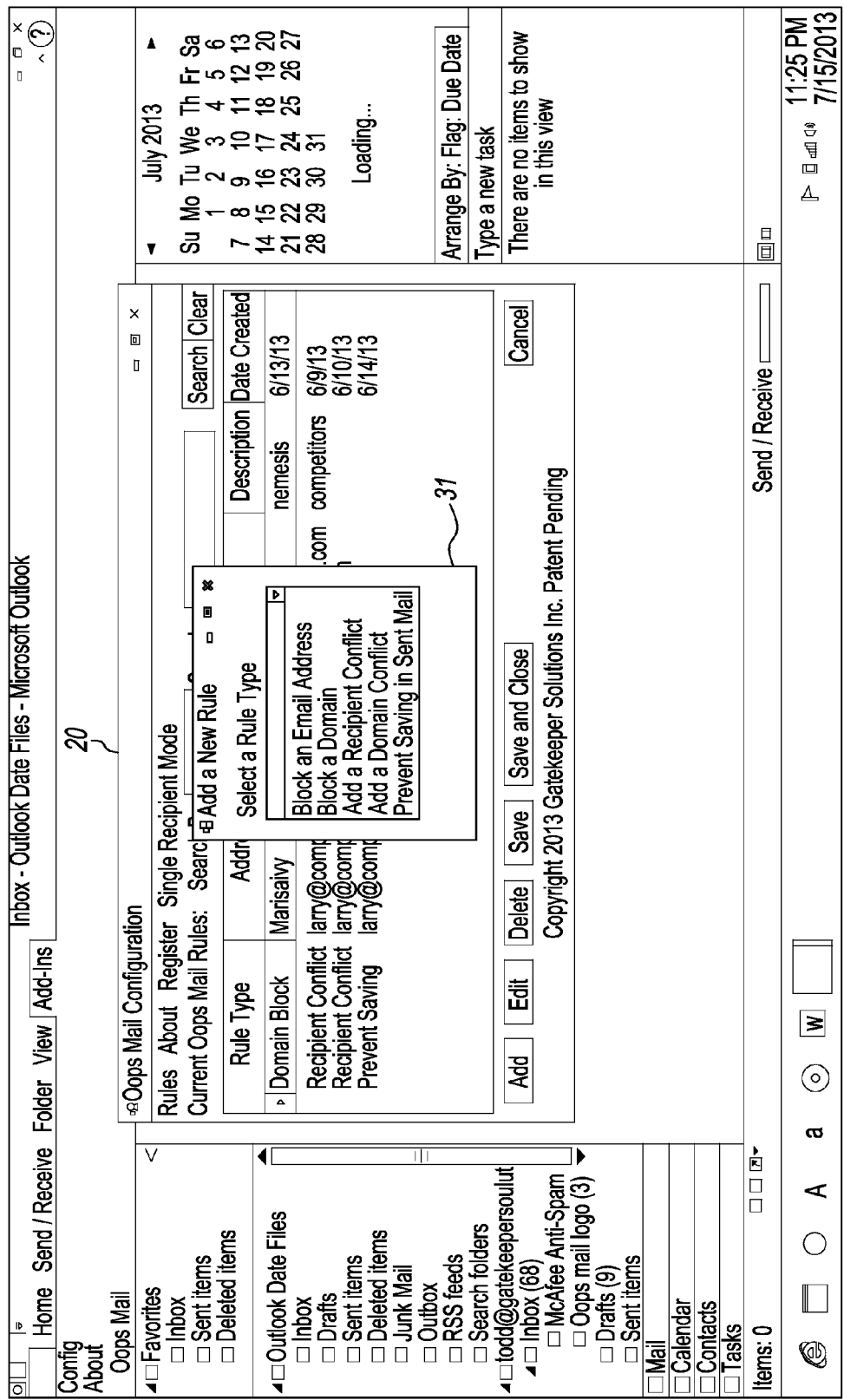
FIG. 13 is a screen print of a computer monitor display by the system of the present invention and illustrates a drop down menu of various rules available for configuration.

When the user clicks onto "Add" in the Configuration dialog box 20, a "Add a New Rule" dialog box 31 appears as shown in FIG. 13. The user can choose one of the many "Rule Type" available from the system from a drop down menu, such as "Block an Email Address" (i.e. individual recipient conflict), "Block a Domain" (i.e. single second level domain conflict), "Add a Recipient Conflict" (i.e. recipient conflicting pair or conflicting group), "Add a Domain Conflict" (i.e. second level domain conflicting pair or conflicting group), "Prevent Saving in Sent Mail" (i.e. action of deleting from "Sent" folder or "Delete" folder).

Figure 14:
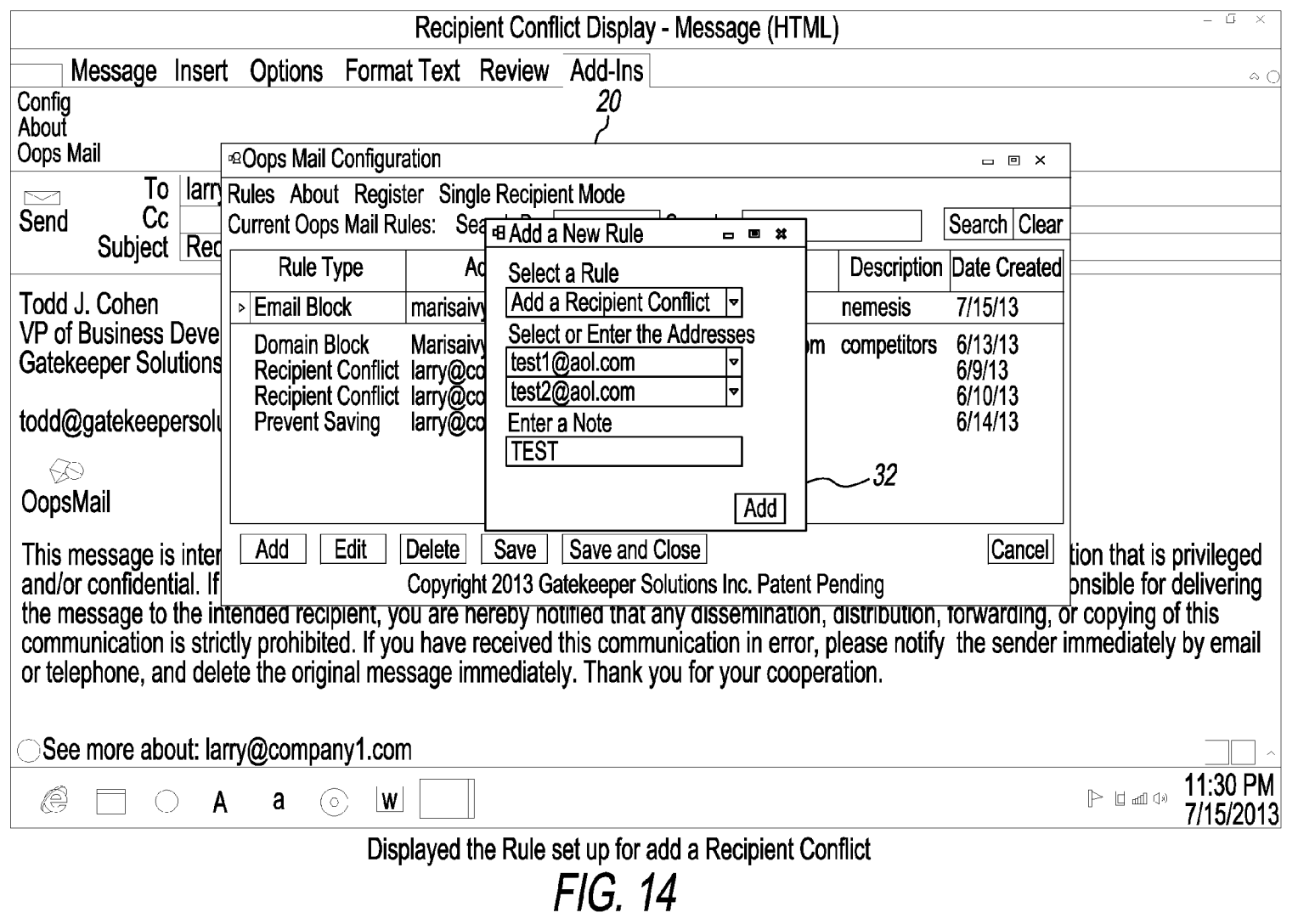

When the user chooses "Add a Recipient Conflict" in the "Add a New Rule" dialog box 31, additional information is requested from the user in dialog box 32 as shown in FIG. 14. The user can input or choose from a drop down menu the email addresses of the conflicting pair, i.e. test1@aol.com and test2@aol.com, and may enter a Note or Description for this Rule. The email addresses for the drop down menu may be populated from the user's Contact list that resides within Microsoft® Outlook or imported from a separate file. When the user clicks on the button "Add" in dialog box 32, the parameters for the rule is saved in the system.

Figure 15:
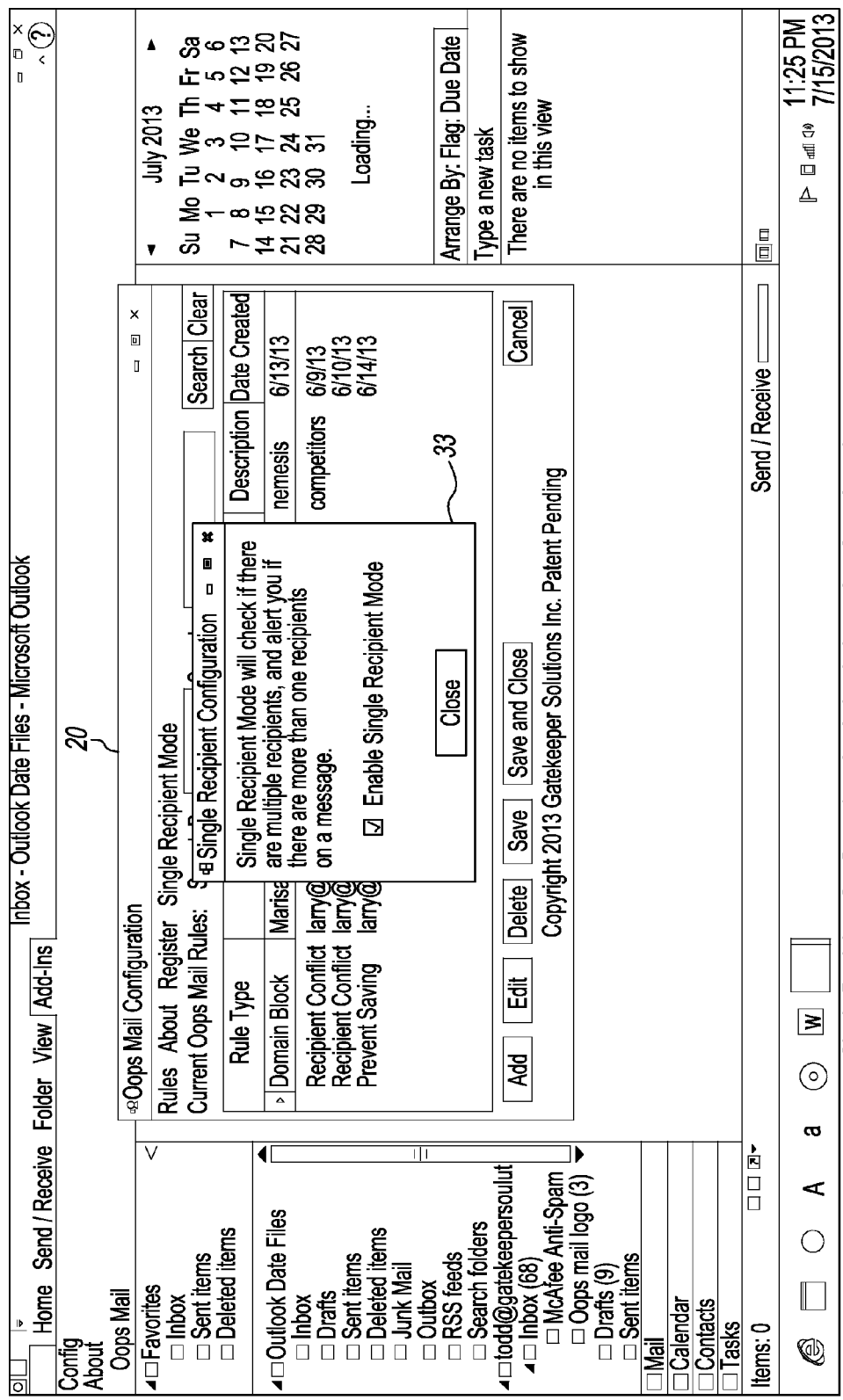
FIG. 15 is a screen print of a computer monitor display by the system of the present invention and illustrates another rule available for configuration.

Referring to FIG. 15, the Configuration dialog box 20 provides a special rule that can be set up independently called "Single Recipient Mode." When the user clicks on the "Single Recipient Mode" on the top menu of the dialog box 20, the "Single Recipient Configuration" dialog box 33 appears. The user can enable (or disable) the "Single Recipient Mode," which blocks the sending of all emails with more than one recipient.

Figure 16:
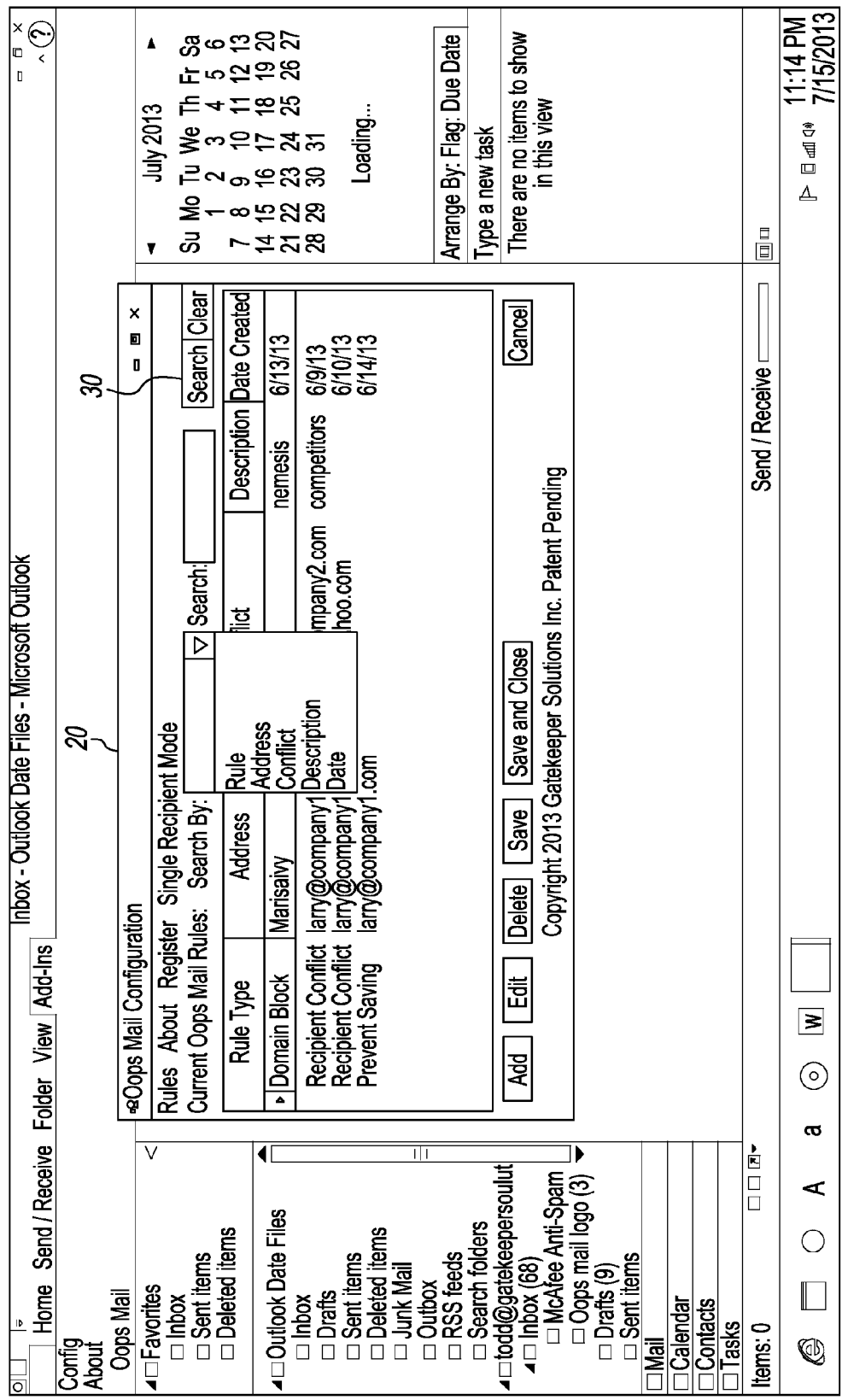
FIG. 16 is a screen print of a computer monitor display by the system of the present invention and illustrates the search feature.

Referring to FIG. 16, the Configuration dialog box 20 provides a "Search" 30 feature within the configuration settings (i.e. parameters). The search can be "Search By" any of the column headings, i.e. a "Rule," an "Address," a "Conflict," a "Description," or a "Date."

Figure 17:
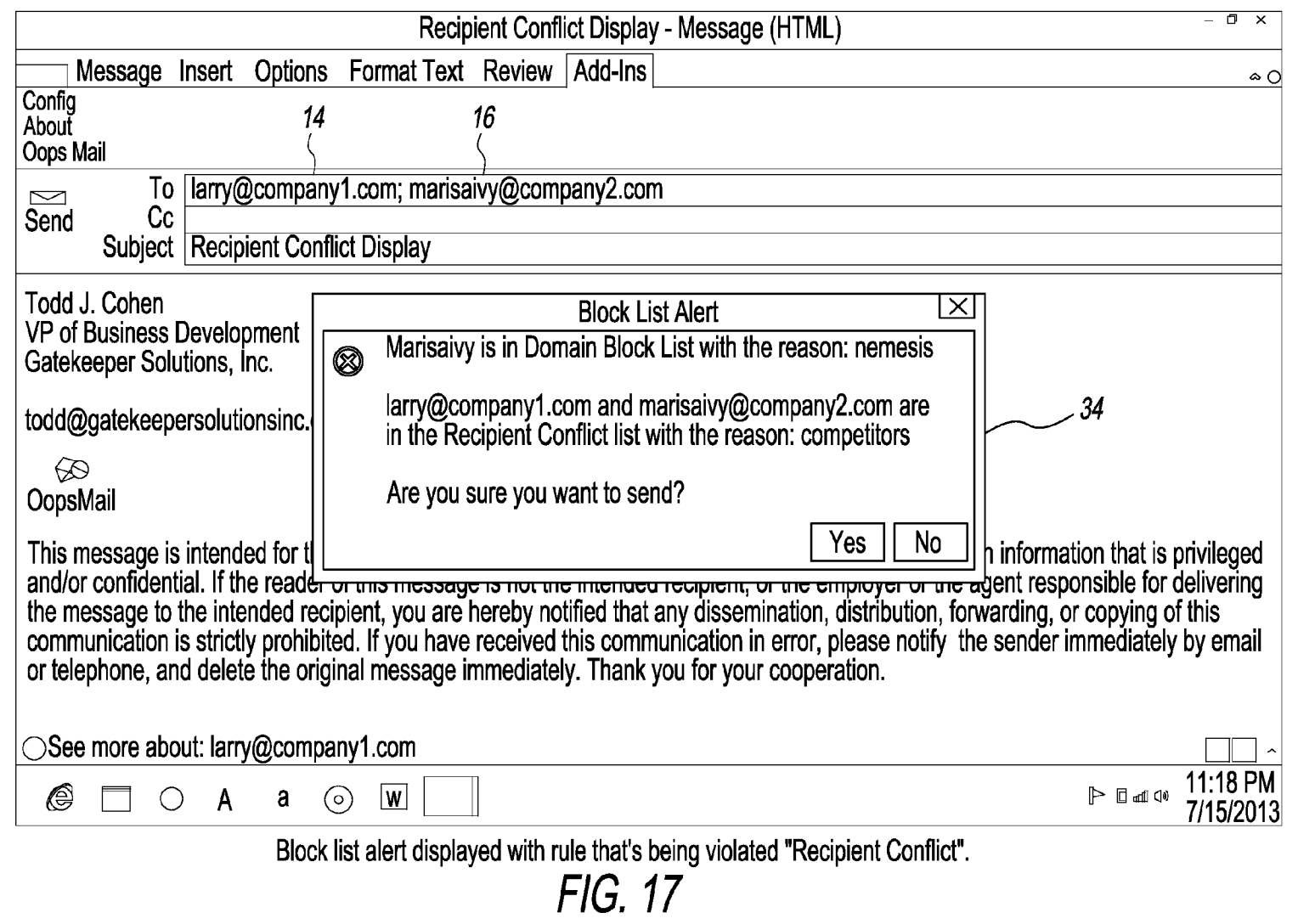
Figure 18:
FIG. 18 is a screen print of a computer monitor display by the system of the present invention and illustrates the notice to the user of multiple rules being violated/triggered and the option to override.

When the user tries to send an email to recipient 14 and recipient 16 by pressing the "Send" button, the system checks the parameters and if a violation is detected, the email is not sent and a notice dialog box "Block List Alert" appears as shown in FIG. 17. FIG. 17 illustrates that two rules were violated, i.e. "Domain Block List" and "Recipient Conflict." The descriptions of the rules are shown as the reason for the blocking. The user is provided with the option of overriding the block and violation to send the email as is. If the user chooses to override the block, the email is sent. If the user chooses not to override the block, the user can manually correct the email by removing recipient 16 from the email and then press "Send" again. FIG. 18 shows a "Block List Alert" dialog box 35 similar to dialog box 34, except this illustrates that four rules were violated, i.e. "Email Block List," "Domain Block List," "Recipient Conflict," and "Multiple Recipients." The user is provided with the option of overriding the block and violation to send the email as is. If the user chooses to override the block, the email is sent. Although FIGS. 17 and 18 illustrate an "all or nothing" overriding option, it is contemplated that each violation may have its own option of overriding such that the user can selectively override some, all or none of the violations. Further, the option of editing the email addresses to avoid the violation may also be provided within the dialog box 34 or 35 without the need to return to the original email being composed.

Figure 19:
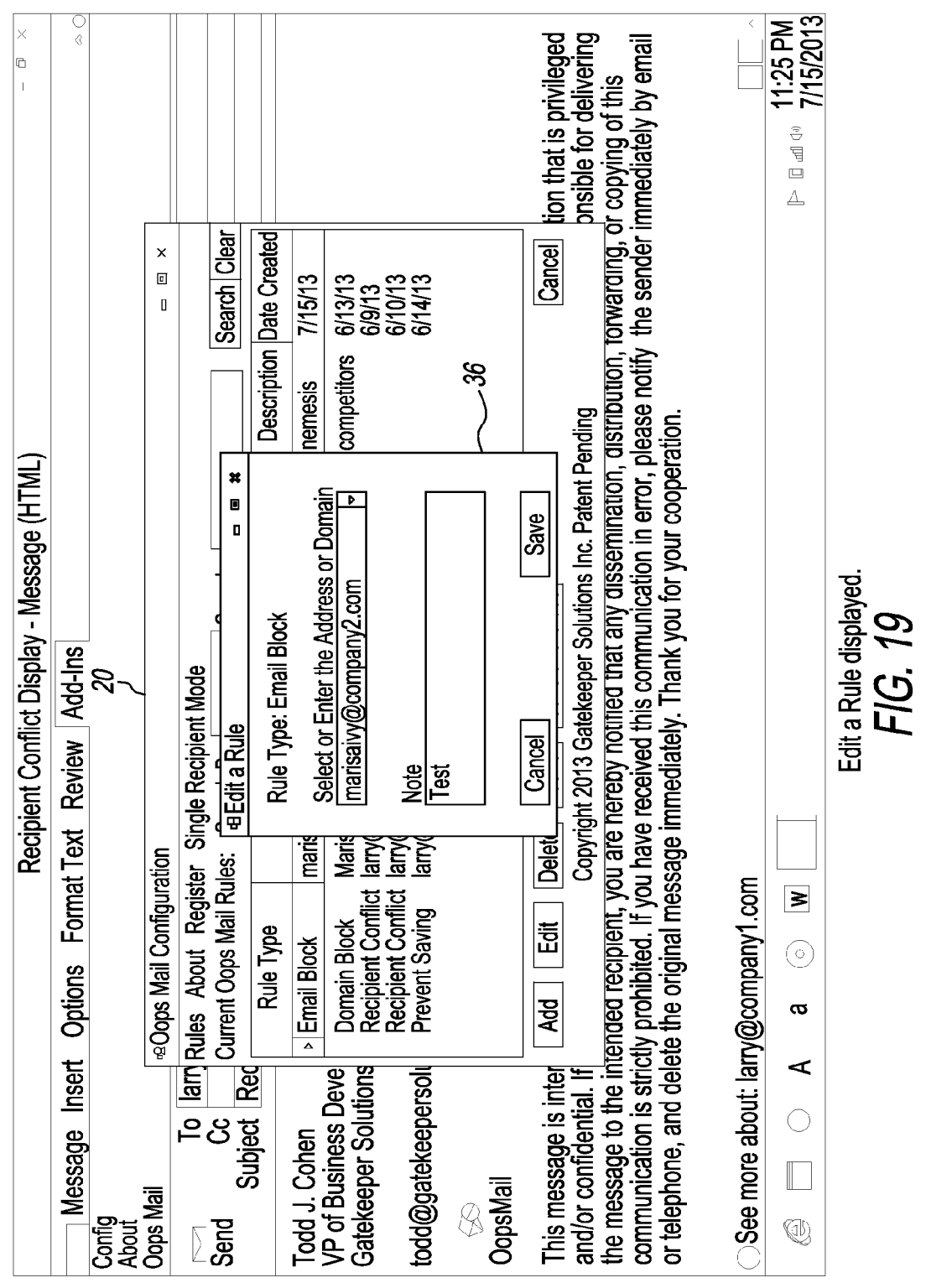

When the user clicks onto "Edit" in the Configuration dialog box 20, a "Edit a Rule" dialog box 36 appears as shown in FIG. 19. Referring to FIG. 19, the user can input or select an email address from a drop down menu when the "Email Block" rule is edited. The Note or Description may also be edited. Once the user clicks the button "Save" in dialog box 36, the parameters for the rule is saved in the system.

It is understood and contemplated that when referring to electronic communication in the above descriptions with the figures, it includes all forms of electronic communications, including but not limited to emails, SMS and other text messages, Twitter® messages (tweets), Facebook® and other blog postings, telephone calls, instant messaging, etc.

The features of the invention illustrated and described herein are the preferred embodiments. Therefore, it is understood that the appended claims are intended to cover the variations disclosed and unforeseeable embodiments with insubstantial differences that are within the spirit of the claims.

What we claim is:

1. A system for ensuring an electronic communication being sent by a user to two or more recipients, each recipient having at least one associated email address, telephone number and/or title, is not sent to another conflicting recipient, comprises:
   a. means for receiving one or more parameters identifying conditions for a conflicting recipient for each recipient;
   b. means for storing said parameters;
   c. means for comparing the parameters of each recipient of said electronic communication with said parameters of other recipients to determine whether any of the other recipients is a conflicting recipient;
   d. means for stopping the sending of the electronic communication when said comparing means determines at least one conflicting recipient;
   e. means for notifying the user of each conflicting recipient as determined by said comparing means and the parameters that identify each conflicting recipient; and
   f. means for sending the electronic communication when said comparing means does not determine at least one conflicting recipient.

2. The system of claim 1, further comprises:
means for overriding the stopping means to allow the sending means to send the electronic communication despite a conflicting recipient.

3. The system of claim 2, further comprises:
means for editing the electronic communication to remove a conflicting recipient.

4. The system of claim 3, further comprises:
means for deleting the electronic communication from the system after it is sent.

5. The system of claim 1, further comprises:
means for integrating said system with an electronic communication program.

6. The system of claim 1, wherein said parameter identifies one or more conflicting recipients inclusion of all of which are conflicting recipients.

7. A system for ensuring an electronic communication being sent by a user to one or more recipients, each recipient having at least one associated email address, telephone number and/or title, is not sent to one or more inappropriate recipients, comprises:
   a. means for receiving one or more parameters identifying conditions for an inappropriate recipient, wherein said parameter identifies a group of one or more recipients lacking one or more of which the remaining recipients are inappropriate recipients;
   b. means for storing said parameters;
   c. means for comparing each recipient of said electronic communication with said parameters to determine whether a recipient is an inappropriate recipient;
   d. means for stopping the sending of the electronic communication when said comparing means determines at least one inappropriate recipient;
   e. means for notifying the user of each inappropriate recipient as determined by said comparing means and the parameters that identify each inappropriate recipient; and
   f. means for sending the electronic communication when said comparing means does not determine at least one inappropriate recipient.

8. The system of claim 7, wherein said parameter identifies any two recipients as an inappropriate recipient.

9. The system of claim 7, further comprises:
a list of the user's potential recipients' contact information, wherein said parameter identifies a recipient not on said list as an inappropriate recipient.

10. The system of claim 1, wherein said parameter identifies a conflicting recipient by an email address.

11. The system of claim 1, wherein said parameter identifies a conflicting recipient by a portion of an email address.

12. The system of claim 1, wherein said parameter identifies a conflicting recipient by a telephone number.

13. The system of claim 1, wherein said parameter identifies a conflicting recipient by a portion of a telephone number.

14. The system of claim 1, wherein said parameter identifies a conflicting recipient by a title.

15. The system of claim 1, wherein said comparing means compares the recipient's email address with said parameters.

16. The system of claim 1, wherein said comparing means compares the recipient's telephone number with said parameters.

17. The system of claim 1, wherein said comparing means compares the recipient's title with said parameters.

18. The system of claim 1, wherein the electronic communication is selected from a group consisting of: electronic mail, text message, instant message, social media distribution and blogging.

19. The system of claim 1, wherein said storing means comprises one or more databases.

20. The system of claim 1, wherein said storing means comprises persistent storage.

21. The system of claim 1, further comprises:
means for recording each instance when a conflicting recipient is determined by said comparing means, including the parameters that identify the conflicting recipient and other information on the electronic communication.

22. The system of claim 2, further comprises:
means for recording each instance when the stopping means is overridden, including the parameters that identify the conflicting recipient that was overridden and other information on the electronic communication.

23. A method for ensuring an electronic communication being sent by a user to two or more recipients, each recipient having at least one associated email address, telephone number and/or title, is sent to another conflicting recipient, comprises the steps of:
a. receiving one or more parameters identifying conditions for a conflicting recipient for each recipient;
b. storing said parameters;
c. comparing the parameters of each recipient of said electronic communication with said parameters of other recipients to determine whether any of the other recipients is a conflicting recipient;
d. stopping the sending of the electronic communication when at least one conflicting recipient is determined;
e. notifying the user of each conflicting recipient and the parameters that identify each conflicting recipient; and
f. sending the electronic communication when there is no conflicting recipient.

24. The method of claim 23, further comprises the step of: overriding the stopping to allow the sending of the electronic communication despite a conflicting recipient.

25. The method of claim 24, further comprises the step of: editing the electronic communication to remove a conflicting recipient.

26. The method of claim 25, further comprises the step of: deleting the electronic communication from the system after it is sent.

27. The method of claim 23, further comprises the step of: integrating said system with an electronic communication program.

28. The method of claim 23, wherein said parameter identifies one or more conflicting recipients inclusion of all of which are conflicting recipients.

29. A method for ensuring an electronic communication being sent by a user to one or more recipients, each recipient having at least one associate email address, telephone number and/or title, is sent to an appropriate recipient, comprising the steps of:
a. receiving one or more parameters identifying conditions for an inappropriate recipient, wherein said parameter identifies a group of one or more recipients lacking one or more of which the remaining recipients are inappropriate recipients;
b. storing said parameters;
c. comparing each recipient of said electronic communication with said parameters to determine whether a recipient is an inappropriate recipient;
d. stopping the sending of the electronic communication when at least one inappropriate recipient is determined;
e. notifying the user of each inappropriate recipient and the parameters that identify each inappropriate recipient; and
f. sending the electronic communication when there is no inappropriate recipient.

30. The method of claim 29, wherein said parameter identifies any two recipients as an inappropriate recipient.

31. The method of claim 29, further comprises the step of: providing a list of the user's potential recipients' contact information, wherein said parameter identifies a recipient not on said list as an inappropriate recipient.

32. The method of claim 23, wherein said parameter identifies a conflicting recipient by an email address.

33. The method of claim 23, wherein said parameter identifies a conflicting recipient by a portion of an email address.

34. The method of claim 23, wherein said parameter identifies a conflicting recipient by a telephone number.

35. The method of claim 23, wherein said parameter identifies a conflicting recipient by a portion of a telephone number.

36. The method of claim 23, wherein said parameter identifies a conflicting recipient by a title.

37. The method of claim 23, wherein the recipient's email address is being compared with said parameters.

38. The method of claim 23, wherein the recipient's telephone number is being compared with said parameters.

39. The method of claim 23, wherein the recipient's title is being compared with said parameters.

40. The method of claim 23, wherein the electronic communication is selected from a group consisting of: electronic mail, text message, instant message, social media distribution and blogging.

41. The method of claim 23, wherein said parameters are stored in one or more databases.

42. The method of claim 23, wherein said parameters are stored in persistent storage.

43. The method of claim 23, further comprises the step of:
recording each instance when a conflicting recipient is determined after comparing, including the parameters that identify the conflicting recipient and other information on the electronic communication.

44. The method of claim 24, further comprises the step of:
recording each instance of overriding, including the parameters that identify the conflicting recipient that was overridden and other information on the electronic communication.

45. A system for ensuring an electronic communication being sent by a user to two or more recipients, each recipient having at least one associated email address, telephone number and/or title, is not sent to another conflicting group of recipient, comprises:
  a. means for receiving one or more parameters identifying conditions for a conflicting group of recipient for each recipient;
  b. means for storing said parameters;
  c. means for comparing the parameters of each recipient of said electronic communication with said parameters of other recipients to determine whether any of the other recipients is in a conflicting group of recipient;
  d. means for stopping the sending of the electronic communication when said comparing means determines at least one conflicting recipient;
  e. means for notifying the user of each conflicting recipient as determined by said comparing means and the parameters that identify each conflicting recipient; and
  f. means for sending the electronic communication when said comparing means does not determine at least one conflicting recipient.

\* \* \* \* \*

UNITED STATES PATENT AND TRADEMARK OFFICE
CERTIFICATE OF CORRECTION

| | | |
|---|---|---|
| PATENT NO. | : 9,032,038 B2 | Page 1 of 1 |
| APPLICATION NO. | : 14/027126 | |
| DATED | : May 12, 2015 | |
| INVENTOR(S) | : Stephen G. Dick et al. | |

It is certified that error appears in the above-identified patent and that said Letters Patent is hereby corrected as shown below:

In the claims

Column 17, line 44, of Claim 23, add --not-- between "is" and "sent"

Signed and Sealed this
Twenty-second Day of September, 2015

Michelle K. Lee
*Director of the United States Patent and Trademark Office*